United States Patent
Radev et al.

(10) Patent No.: US 11,842,210 B2
(45) Date of Patent: Dec. 12, 2023

(54) SYSTEMS, METHODS, AND APPARATUS FOR HIGH AVAILABILITY APPLICATION MIGRATION IN A VIRTUALIZED ENVIRONMENT

(71) Applicant: VMware, Inc., Palo Alto, CA (US)

(72) Inventors: Ivaylo Radoslavov Radev, Sofia (BG); Deepak Babarjung, Palo Alto, CA (US); Maarten Wiggers, Mountain View, CA (US); Rajesh Venkatasubramanian, San Jose, CA (US); Sahan Bamunavita Gamage, San Jose, CA (US); Tomo Vladimirov Simeonov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 65 days.

(21) Appl. No.: 17/510,126

(22) Filed: Oct. 25, 2021

(65) Prior Publication Data
US 2023/0130553 A1    Apr. 27, 2023

(51) Int. Cl.
| | |
|---|---|
| G06F 11/20 | (2006.01) |
| G06F 9/455 | (2018.01) |
| G06F 9/48 | (2006.01) |
| G06F 16/27 | (2019.01) |
| G06F 8/61 | (2018.01) |

(52) U.S. Cl.
CPC ............ *G06F 9/45558* (2013.01); *G06F 8/61* (2013.01); *G06F 9/4856* (2013.01); *G06F 11/203* (2013.01); *G06F 11/2025* (2013.01); *G06F 16/27* (2019.01); *G06F 2009/4557* (2013.01); *G06F 2009/45575* (2013.01); *G06F 2009/45587* (2013.01); *G06F 2201/815* (2013.01)

(58) Field of Classification Search
CPC ............... G06F 11/2025; G06F 11/203; G06F 9/45558; G06F 9/4856; G06F 2009/45575
See application file for complete search history.

(56) References Cited

U.S. PATENT DOCUMENTS

| | | | | |
|---|---|---|---|---|
| 8,621,461 | B1 * | 12/2013 | Chandrachari | ..... G06F 9/45545 718/1 |
| 10,228,969 | B1 * | 3/2019 | Gupta | ..................... G06F 9/541 |
| 10,404,579 | B1 * | 9/2019 | Biemueller | ......... H04L 41/0803 |
| 11,385,972 | B2 * | 7/2022 | K | ........................ G06F 11/3433 |
| 11,500,663 | B1 * | 11/2022 | Gupta | ................. G06F 9/45558 |

(Continued)

*Primary Examiner* — Joseph O Schell
(74) *Attorney, Agent, or Firm* — Hanley, Flight & Zimmerman, LLC

(57) ABSTRACT

Methods, apparatus, systems, and articles of manufacture are disclosed for high availability (HA) application migration in a virtualized environment. An example apparatus includes at least one memory, instructions in the apparatus, and processor circuitry to at least one of execute or instantiate the instructions to identify an HA slot in a virtual server rack, the HA slot to facilitate a failover of an application executing on a first virtual machine (VM) in the virtual server rack, the first VM identified as a protected VM, deploy a second VM in the HA slot, transfer data from the first VM to the second VM, and, in response to not identifying a failure of at least one of the first or second VMs during the transfer, trigger a shutdown of the first VM, and synchronize migration data associated with the virtual server rack to identify the second VM as the protected VM.

24 Claims, 14 Drawing Sheets

(56) References Cited

U.S. PATENT DOCUMENTS

| | | | | |
|---|---|---|---|---|
| 2014/0372790 A1* | 12/2014 | Antony | ............ | G06F 9/455 |
| | | | | 714/4.11 |
| 2018/0165166 A1* | 6/2018 | Wang | ............ | G06F 11/2033 |
| 2020/0026810 A1* | 1/2020 | Subramaniam | ....... | G06F 9/5094 |
| 2021/0326165 A1* | 10/2021 | Shibayama | .......... | G06F 3/0631 |

\* cited by examiner

SYSTEMS, METHODS, AND APPARATUS FOR HIGH AVAILABILITY APPLICATION MIGRATION IN A VIRTUALIZED ENVIRONMENT

FIELD OF THE DISCLOSURE

This disclosure relates generally to cloud computing and, more particularly, to systems, methods, and apparatus for high availability application migration in a virtualized environment.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and network resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, network devices (e.g., routers, switches, etc.), etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
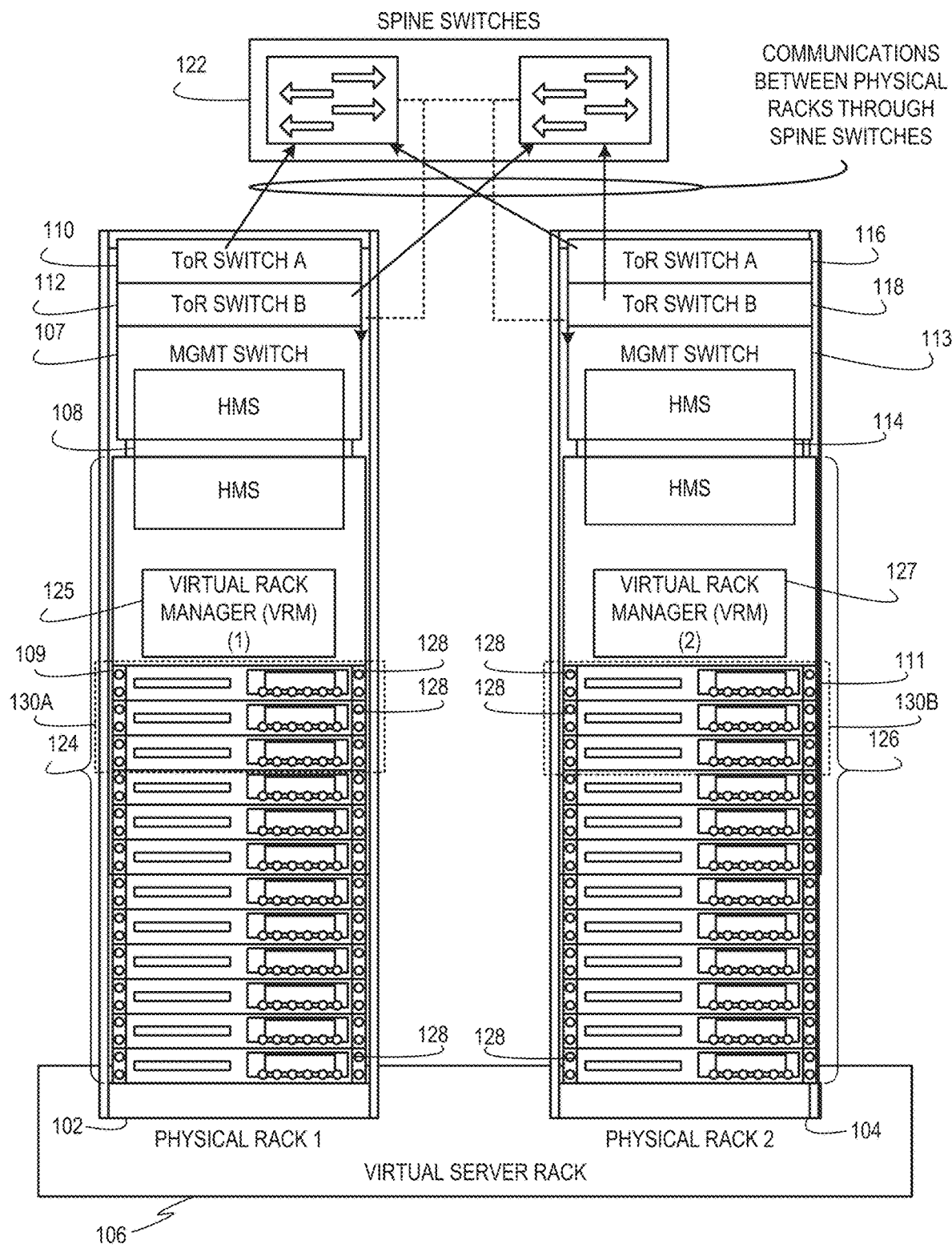
FIG. 1 illustrates example physical racks in an example virtual server rack deployment.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). In some examples, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, VMWARE® ESXi® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples described herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples described herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples described herein facilitate making workload domain configuration and management easier than prior techniques.

A management domain is a group of physical machines and VMs that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples described herein enable customers to define different domain types, security, machine learning, capacity, availability, and performance requirements for establishing workload domains in server rack deployments without requiring the users to have in-depth knowledge of server rack hardware and/or configurations.

As used herein, availability refers to the level of redundancy required to provide continuous operation expected for the workload domain. For example, availability may refer to a level of redundancy that is implemented by allocating or reserving one or more backup resources (e.g., hardware resources, virtual resources, etc.) for one or more respective operational resources (e.g., resources executing application(s)). As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and/or power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processor units (GPUs)), etc.) across all servers associated with a cluster and/or a workload domain. In examples described herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

An application in a virtualized environment may be deployed as a VM or a container. In some examples, an application may be distributed across multiple VMs and/or containers. During a lifecycle of the application, the application may be upgraded using either an in-place upgrade or a migration-based upgrade. As used herein, an in-place upgrade of an application refers to an installation of a new version of the application without removing an older version of the application and/or without saving any data associated with the application beyond normal precautions. However, in-place upgrades of applications may cause failures, especially if the new version of the application is very different from the old version.

As used herein, a migration-based upgrade of an application refers to an installation of a new version of the application by installing the new version of the application, migrating and/or otherwise moving data from an old version of the application to the new version, and removing the old version upon a successful migration of the data. Advantageously, migration-based upgrades may facilitate recovery easier than in-place upgrades by re-instantiating the old version of the application (e.g., the VM, the container, etc., utilized to execute the application). However, migration-based upgrades require extra resources (e.g., CPU, memory, storage, etc.) to be temporarily provided during the upgrade process. For example, a cluster of hosts may require twice the number of CPU resources to be temporarily used for the migration-based upgrade.

In some virtualized environments, an application may be executed in a high availability (HA) (also referred to as highly available) mode configuration. For example, an application may be run on a cluster of three server host nodes to which a first one of the three server host nodes executes the application and a second and third one of the three server host nodes are idle. In some such examples, in response to a failure of the first server host node, the application may failover to the second server host node. As used herein, a failover refers to restarting an application that failed on a first resource (e.g., a VM, a container, etc.) on a second resource. Advantageously, a failover may mitigate a failure of an underlying hardware resource of the first virtual resource.

In some examples, operating an application in a HA mode configuration may require at least twice the number of resources. For example, an application may require 50 CPU GHz to execute and 50 CPU GHz in reserve to facilitate a failover in response to a failure of the application. In some such examples, executing a migration-based upgrade for an HA application may require additional CPU GHz. For example, the HA application may require 100 CPU GHz (e.g., 50 CPU GHz to run the application and 50 CPU GHz in reserve) to operate and an additional 100 CPU GHz to facilitate the migration-based upgrade. At scale, reserving additional resources to facilitate migration-based upgrades of larger and more complex applications may result in a substantially inefficient utilization of resources, which may be instead utilized to execute other workloads.

Examples disclosed herein include HA virtual resource migration in virtualized environments (e.g., virtual computing environments, cloud computing environments, etc.). In some disclosed examples, VM(s) (or container(s)) may execute HA application(s) in first slot(s) and the HA application(s) utilize one or more reserved (e.g., pre-reserved) slots to accommodate a failover of an application executing on the VM(s) (or the container(s)). For example, a first VM (or a first container) may execute an HA application in a first slot and, in response to a failure of the first slot (e.g., resources associated with the first slot), the first VM may be restarted in one(s) of the reserved slots.

As used herein, a slot (e.g., a resource slot, a virtual slot, etc.) refers to a minimum level of resources (e.g., CPU, memory, storage, etc.) required to instantiate a single virtual resource (e.g., a VM, a container, a virtual appliance, etc.). For example, a host may have a first quantity of CPU resources and a first quantity of memory resources. In some such examples, the host may include and/or otherwise be configured to implement a plurality of slots with one(s) of the plurality of the slots having a second quantity of CPU resources less than the first quantity of CPU resources and/or a second quantity of memory resources less than the first quantity of memory resources.

In some disclosed examples, an application upgrader can identify a slot reserved and/or otherwise allocated for failover of an HA application. The example application upgrader can utilize the identified slot for an application migration-based upgrade. Advantageously, the example application upgrader can utilize the reserved slot for the application migration-based upgrade instead of allocating additional resources (e.g., additional slot(s)) for the application migration-based upgrade.

In some disclosed examples, the application upgrader achieves the HA virtual resource migration by identifying a source VM (or other virtual resource such as a virtual appliance or container) and a target VM as a pair (e.g., a protected pair including a protected virtual machine and an unprotected virtual machine) with a protected primary and an unprotected secondary. For example, in response to triggering the migration, the application upgrader can identify the source VM, which may be executing the HA application, as the protected primary and the target VM, which may be spun up, launched, and/or otherwise instantiated in a reserved slot. For example, the HA application executing on the source VM can failover to another slot, such as the reserved slot, when the source VM is identified as the protected primary. In some such examples, the target VM can be allowed to fail and/or otherwise be decommissioned when the target VM is identified as the unprotected secondary. In some disclosed examples, in response to a successful upgrade, migration, etc., the application upgrader can switch the roles of the source and target VMs by identifying the target VM as the protected primary and the source VM as the unprotected secondary. In some such disclosed examples, in response to the switching of the roles, the application upgrader can spin down, shutdown, and/or otherwise decommission the source VM and invoke the target VM to execute the HA application. Advantageously, the example application upgrader can achieve HA virtual resource migration with reduced resources compared to prior HA virtual resource migrations.

FIG. 1 depicts example physical racks 102, 104 in an example deployment of the virtual server rack 106. The virtual server rack 106 of the illustrated example enables abstracting hardware resources (e.g., physical hardware resources 124, 126). In some examples, the virtual server rack 106 includes a set of physical units (e.g., one or more racks) with each unit including hardware such as server nodes (e.g., compute+storage+network links), network switches, and, optionally, separate storage units. From a user perspective, the example virtual server rack 106 is an aggregated pool of logic resources exposed as one or more VMWARE® ESXI™ clusters (e.g., example clusters 130A, 130B) along with a logical storage pool and network connectivity. In examples disclosed herein, a cluster is a server group in a virtual environment. For example, a VMWARE® ESXI™ cluster (e.g., example clusters 130A, 130B) is a group of physical servers in the physical hardware resources that run ESXI™ hypervisors to virtualize processor, memory, storage, and network resources into logical resources to run multiple VMs that run OSs and applications as if those OSs and applications were running on physical hardware without an intermediate virtualization layer.

In the illustrated example, the first physical rack 102 has an example top-of-rack (ToR) switch A 110, an example ToR switch B 112, an example management switch 107 (identified as MGMT SWITCH), and an example server host node(0) 109. In the illustrated example, the management switch 107 and the server host node(0) 109 run a hardware management system (HMS) 108 for the first physical rack 102. The second physical rack 104 of the illustrated example is also provided with an example ToR switch A 116, an example ToR switch B 118, an example management switch 113, and an example server host node(0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC)), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private Internet Protocol (IP) management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management. In examples disclosed herein, the ToR switches 110, 112, 116, 118 connect to server network interface card (NIC) ports (e.g., using 10 Gbps links) of example server hosts 128 (e.g., including the server host nodes(0) 109, 111) in the physical racks 102, 104 for downlink communications and to the spine switch(es) 122 (e.g., using 30 Gbps links) for uplink communications. In the illustrated example, the management switch 107, 113 is also connected to the ToR switches 110, 112, 116, 118 (e.g., using a 10 Gbps link) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126) of the physical rack 102, 104. In the illustrated example, the IB connection interfaces to physical hardware resources 124, 126 via an OS running on the server nodes using an OS-specific application programming interfaces (API) such as VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical resources 124, 126 and to keep server objects and switch objects up to date. Example IB operations performed by the HMS 108, 114 include controlling power state, accessing temperature sensors, controlling BIOS (Basic Input/Output System) inventory of hardware (e.g., central processing units (CPUs), memory, disks, etc.), event monitoring, and logging events.

The HMSs 108, 114 of the corresponding physical racks 102, 104 interface with example virtual rack managers (VRMs) 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the VRM 125 of the first physical rack 102 runs on the example cluster 130A of three server host nodes from the example hosts 128 of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the VRM 127 of the second physical rack 104 runs on the example cluster 130B of three server host nodes from the example hosts 128 of the second physical rack 104, one of which is the server host node(0) 111. In the illustrated example, the VRMs 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The VRM 125 of the first physical rack 102 runs on the example cluster 130A of three server host nodes from the example hosts 128 of the first physical rack 102 using a high availability (HA) mode configuration. In addition, the VRM 127 of the second physical rack 104 runs on the example cluster 130B of three server host nodes from the example hosts 128 of the second physical rack 104 using the HA mode configuration. Using the HA mode in this manner, enables fault tolerant operation of the VRM 125, 127 in the event that one of the three server host nodes 128 of one or more of the example cluster 130A, 130B for the VRM 125, 127 fails. Upon failure of a server host node 128 executing the VRM 125, 127, the VRM 125, 127 can be restarted to execute on another one of the hosts 128 in the cluster 130A, 130B. Therefore, the VRM 125, 127 continues to be available even in the event of a failure of one of the server host nodes 128 in the cluster 130A, 130B.

In examples disclosed herein, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object that stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113) in the physical rack 102, 104. However, any other programming language and any other OS may be used to implement the HMS 108, 114.

Figure 2:
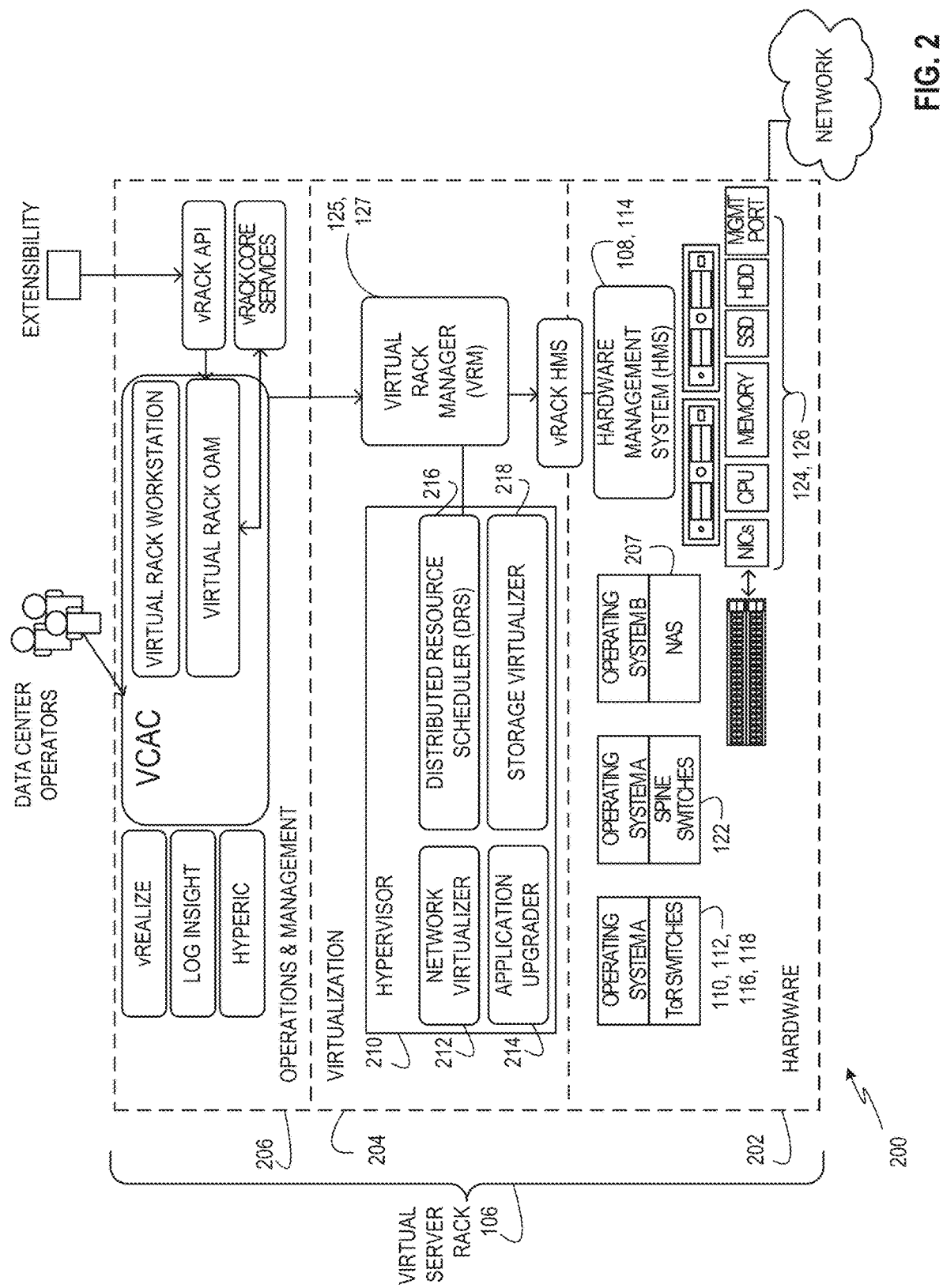
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes an example hardware layer 202, an example virtualization layer 204, and an example operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126 of FIG. 1, virtualizes the physical hardware resources 124, 126 into virtual resources, provisions one(s) of the virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 may run on the management switch 107, 113 and the server host node(0) 109, 111 installed in the example physical rack 102, 104 of FIG. 1. In the illustrated example of FIG. 1, both of the HMSs 108, 114 are provided in corresponding management switches 107, 113 and the corresponding server host nodes (0) 109, 111 as a redundancy feature in which one of the HMSs 108, 114 is a primary HMS, while the other one of the HMSs 108, 114 is a secondary HMS. In this manner, one of the HMSs 108, 114 may take over as a primary HMS in the event of a failure of the hardware management switch 107, 113 and/or a failure of the server host nodes(0) 109, 111 on which the other HMS 108, 114 executes. In some examples, to achieve seamless failover, two instances of an HMS 108, 114 run in a single physical rack 102, 104. In some such examples, the physical rack 102, 104 is provided with two management switches, and each of the two management switches runs a separate instance of the HMS 108, 114. In some such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes (0). In this manner, for example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 includes the VRM 125, 127. The example VRM 125, 127 communicates with the HMS 108, 114 to manage the physical hardware resources 124, 126. The example VRM 125, 127 creates the example virtual server rack 106 out of underlying physical hardware resources 124, 126 that may span one or more physical racks (or smaller units such as a hyper-appliance or half rack) and handles physical management of those resources. The example VRM 125, 127 uses the virtual server rack 106 as a basis of aggregation to create and provide operational views, handle fault domains, and scale to accommodate workload profiles. The example VRM 125, 127 keeps track of available capacity in the virtual server rack 106, maintains a view of a logical pool of virtual resources throughout the SDDC life-cycle, and translates logical resource provisioning to allocation of physical hardware resources 124, 126. The example VRM 125, 127 interfaces with an example hypervisor 210 of the virtualization layer 204. The example hypervisor 210 is installed and runs on the example server hosts 128 in the example physical resources 124, 126 to enable the server hosts 128 to be partitioned into multiple logical servers to create VMs. In some examples, the hypervisor 210 may be implemented using a VMWARE® ESXI™ hypervisor available as a component of a VMWARE® VSPHERE® virtualization suite developed and provided by VMWARE®, Inc. The VMWARE® VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example application upgrader 214, an example distributed resource scheduler 216, an example storage virtualizer 218. In the illustrated example, the VRM 125, 127 communicates with these components to manage and present the logical view of underlying resources such as the hosts 128 and the clusters 130A, 130B. The example VRM 125, 127 also uses the logical view for orchestration and provisioning of workloads.

The example network virtualizer 212 virtualizes network resources such as physical hardware switches (e.g., the management switches 107, 113 of FIG. 1, the ToR switches 110, 112, 116, 118, and/or the spine switches 122) to provide software-based virtual networks. The example network virtualizer 212 enables treating physical network resources (e.g., switches) as a pool of transport capacity. In some examples, the network virtualizer 212 also provides network and security services to VMs with a policy driven approach. The network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on one of the server hosts 128. In some examples, the network virtualizer 212 may be implemented using a VMWARE® NSX™ network virtualization platform that includes a number of components including a VMWARE® NSX™ network virtualization manager.

The example application upgrader 214 is instantiated and/or otherwise provided to implement an upgrade of an application (e.g., an HA application). Additionally or alternatively, the application upgrader 214 may be instantiated and/or otherwise provided to implement an upgrade of a virtual resource. For example, the application upgrader 214 may execute a migration-based upgrade of a first VM by transferring an application, application data associated with the application, etc., to a second VM (or a second container). In some such examples, the application upgrader 214 may upgrade a software and/or firmware version of the first VM and transfer the application, the application data, etc., back to the first VM (after the upgrade) from the second VM. In some examples, the application upgrader 214 may facilitate an upgrade of hardware, software, and/or firmware of underlying physical hardware resources utilized to implement the first VM by transferring the application, the application data, etc., to the second VM. In some such examples, after the upgrade, the application upgrader 214 may transfer the application, the application data, etc., back to the first VM from the second VM.

In some examples, the application upgrader 214 moves or migrates virtual resources (e.g., containers, VMs, virtual appliances, etc.) between different hosts 128 without losing state during such migrations to implement the application upgrade. For example, the application upgrader 214 allows moving an entire running VM from one physical server to another with substantially little or no downtime of the application. The migrating VM retains its network identity and connections, which results in a substantially seamless migration process. The example application upgrader 214 enables transferring the VM's active memory and precise execution state over a high-speed network, which allows the VM to switch from running on a source server host to running on a destination server host. In some examples, the application upgrader 214 effectuates the migration of the virtual resource(s) to achieve upgrade(s) of the application.

The example distributed resource scheduler (DRS) 216 is provided to monitor resource utilization across resource pools, to manage resource allocations to different VMs, to deploy additional storage capacity to VM clusters 130A, 130B with substantially little or no service disruptions, and to work with the application upgrader 214 to automatically migrate virtual resources during maintenance with substantially little or no service disruptions to application(s).

The example storage virtualizer 218 is software-defined storage for use in connection with virtualized environments. The example storage virtualizer 218 clusters server-attached hard disk drives (HDDs) and solid state drives (SSDs) to create a shared datastore for use as virtual storage resources in virtual environments. In some examples, the storage virtualizer 218 may be implemented using a VMWARE® VIRTUAL SAN™ network data storage virtualization component developed and provided by VMWARE®, Inc.

The virtualization layer 204 of the illustrated example, and its associated components are configured to run virtual resources such as VMs. However, in other examples, the virtualization layer 204 may additionally or alternatively be configured to run containers. For example, the virtualization layer 204 may be used to deploy a VM as a data computer node with its own guest OS on a host 128 using resources of the host 128. Additionally or alternatively, the virtualization layer 204 may be used to deploy a container as a data computer node that runs on top of a host OS without the need for a hypervisor or separate OS.

In the illustrated example, the OAM layer 206 is an extension of a VMWARE® VCLOUD® AUTOMATION CENTER™ (VCAC) that relies on the VCAC functionality and also leverages utilities such as VREALIZE™, Log Insight™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMWARE®, Inc. Alternatively, some or all of such components may alternatively be supplied by components with the same or similar features developed and provided by other virtualization component developers.

Figure 3:
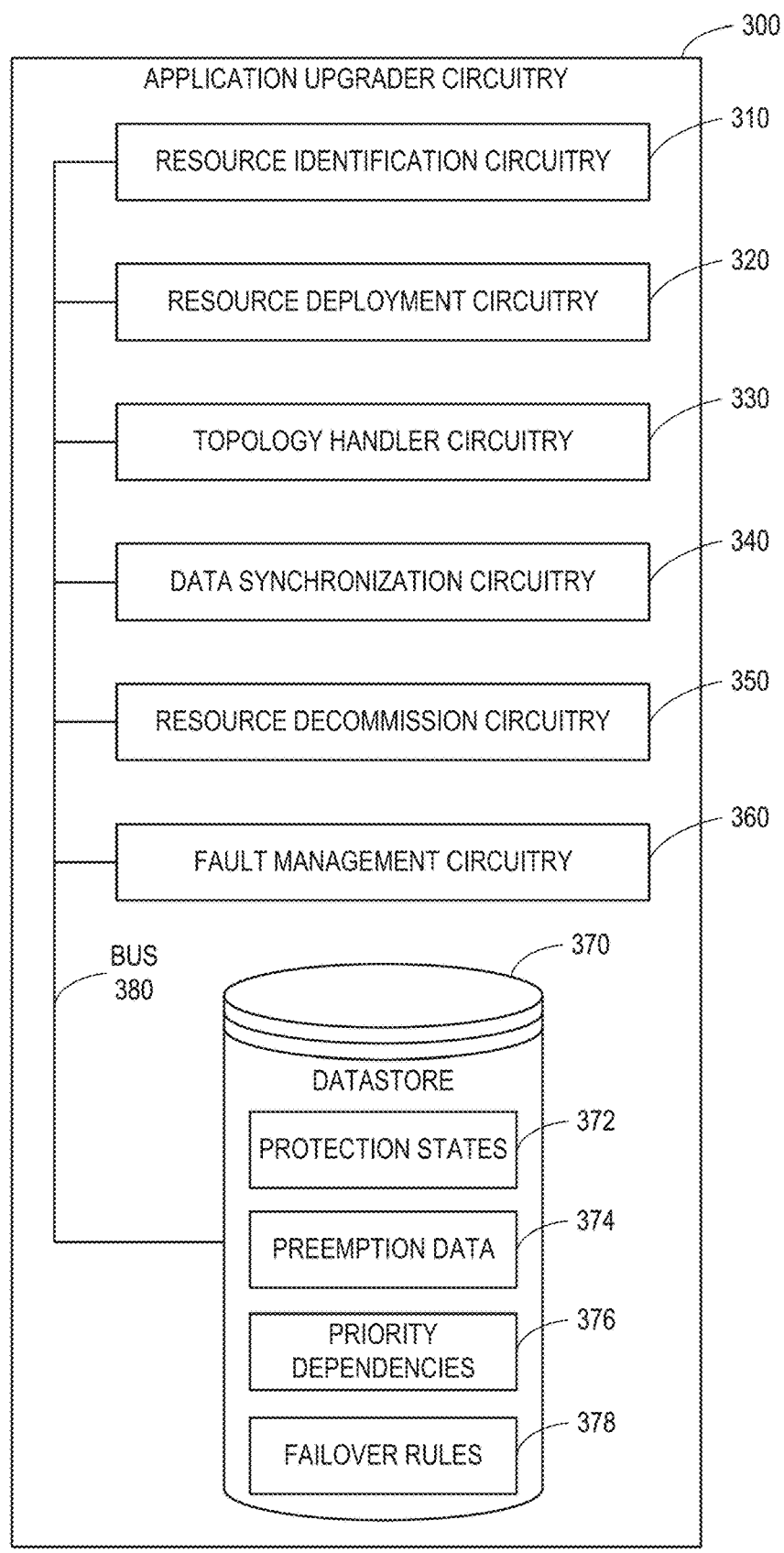
FIG. 3 is a block diagram of an example implementation of the example application upgrader of FIG. 2 including an example datastore.

FIG. 3 is a block diagram of example application upgrader circuitry 300. In some examples, the application upgrader circuitry 300 is an example implementation of the application upgrader 214 of FIG. 2. For example, the application upgrader circuitry 300 can implement a migration-based upgrade of an application, such as an HA application. In some such examples, the application upgrader circuitry 300 may identify a source resource, such as a source VM, executing an HA application. The application upgrader circuitry 300 may identify a reserved slot associated with the HA application. The application upgrader circuitry 300 may spin up a target VM in the reserved slot and achieve the migration-based upgrade without allocating additional resources to the migration-based upgrade. In some examples, the application upgrader circuitry 300 can implement a migration-based upgrade of firmware, software, and/or hardware of a virtual resource (or underlying physical hardware resources utilized to implement the virtual resource) utilizing examples disclosed herein. In the illustrated example of FIG. 3, the application upgrader circuitry 300 includes example resource identification circuitry 310, example resource deployment circuitry 320, example topology handler circuitry 330, example data synchronization circuitry 340, example resource decommission circuitry 350, example fault management circuitry 360, an example datastore 370, which includes example protection states 372, example preemption data 374, example priority dependencies 376, and example failover rules 378, and an example bus 380.

In the illustrated example of FIG. 3, the application upgrader circuitry 300 includes the resource identification circuitry 310 to identify an HA slot in a virtual server rack to facilitate a failover of an application executing on a first virtual resource such as a VM. For example, the resource identification circuitry 310 may identify the virtual server rack 106 of FIGS. 1-2. In some such examples, the resource identification circuitry 310 may determine that the server host node(0) 109 is executing an application. The resource identification circuitry 310 may determine that the application is an HA application. The resource identification circuitry 310 may identify that a different server host node of the cluster 130A is an HA slot to which the application executing on the first virtual resource may failover in response to a failure or non-responsive operation of the first virtual resource.

In some examples, the resource identification circuitry 310 determines whether there is/are available resource(s) to facilitate a failover of an application executing on a resource (e.g., a different VM, a different container, etc.). For example, in response to a failure of the sever host node(0) 109, the resource identification circuitry 310 may determine whether the cluster 130A has or is associated with sufficient resources (e.g., CPU, memory, storage, etc.) to implement a failover of an application implemented by the server host node(0) 109. In some such examples, the resource identification circuitry 310 may determine a quantity of CPU, memory, storage, etc., resources and whether the determined quantities are sufficient to implement the failover.

In some examples, the resource identification circuitry 310 determines whether to upgrade an HA application executing on a first virtual resource. For example, the resource identification circuitry 310 may obtain a command, a direction, an instruction, etc., from a data center operator via an API. In some such examples, the resource identification circuitry 310 may determine that the command, the direction, the instruction, etc., indicates that the HA application (or portion(s) thereof) is to be upgraded from a first version to a second version (e.g., a first software version or build version to a second software version or build version).

In some examples, the resource identification circuitry 310 determines whether to restart an upgrade. For example, the resource identification circuitry 310 may determine that an upgrade of a HA application failed and/or otherwise did not successfully complete. In some such examples, the resource identification circuitry 310 may determine to restart the upgrade. In some examples, the resource identification circuitry 310 determine whether to continue monitoring the virtual server rack 106. For example, the resource identification circuitry 310 can monitor a network interface, a bus, etc., associated with the virtual server rack 106 for commands, instructions, etc., that indicate a change, modification, and/or upgrade of portion(s) of the virtual server rack 106.

In the illustrated example of FIG. 3, the application upgrader circuitry 300 includes the resource deployment circuitry 320 to deploy a virtual resource, such as a VM or a container, in an HA slot. For example, resource identification circuitry 310 may determine that an HA application executing on a first VM implemented by the sever host node(0) 109 has an associated HA slot in the cluster 130A. In some such examples, the resource deployment circuitry 320 may deploy a second VM in the HA slot. For example, the resource deployment circuitry 320 may instantiate, spin up, etc., the second VM in the HA slot. In some such examples, the second VM is a clone, duplicate, or copy of the first VM.

In some examples, the resource deployment circuitry 320 triggers an upgrade, such as a migration-based upgrade, of the first VM. For example, the resource deployment circuitry 320 may trigger a migration-based upgrade of the first VM by instantiating the second VM. In some examples, the resource deployment circuitry 320 restarts a first virtual resource, such as the first VM, using released resources associated with a second virtual resource, such as the second VM, to restore the virtual server rack 106. For example, in response to triggering the migration-based upgrade of the first VM, the first VM may fail during the upgrade. In some such examples, the resource decommission circuitry 350 may dismantle, spin down, shut down, and/or otherwise decommission the second VM. In some such examples, the resource deployment circuitry 320 may failover the first VM onto the second VM by restarting the HA application on the second VM and thereby restore operation of the virtual server rack 106, or portion(s) thereof. In some examples, the resource deployment circuitry 320 may failover the first VM by restarting the HA application on a third VM using available resources of the cluster 130A.

In the illustrated example of FIG. 3, the application upgrader circuitry 300 includes the topology handler circuitry 330 to identify a protection state of a virtual resource. For example, the topology handler circuitry 330 may identify a first protection state of a first VM executing a HA application as protected (e.g., the first VM is a protected VM) and a second protection state of a second VM spun up in an HA slot as unprotected (e.g., the second VM is an unprotected VM). In some such examples, the topology handler circuitry 330 may identify the protection states in response to a trigger of a migration-based upgrade of the HA application. For example, the topology handler circuitry 330 may identify a virtual resource as a protected virtual response in response to a determination that the virtual resource is executing a HA application, or portion(s) thereof, and thereby needs to be restarted with minimal or reduced downtime to achieve HA in response to a failure of the virtual resource. In some examples, the topology handler circuitry 330 may identify the virtual resource as an unprotected virtual resource in response to a determination that the virtual resource is not executing a HA application, or portion(s) thereof, and thereby does not need to be restarted in response to a failure of the virtual resource.

In some examples, the topology handler circuitry 330 generates migration data in response to an initialization of a migration-based upgrade of an HA application. In some examples, the topology handler circuitry 330 generates the migration data to include one or more preemption pairs. For example, a preemption pair may include a protected virtual resource and an unprotected virtual resource. In some such examples, the protected virtual resource may preempt operation or existence of the unprotected virtual resource in response to a failure of the protected virtual resource. For example, in response to a failure of the protected virtual resource, the topology handler circuitry 330 may identify the unprotected virtual resource to be decommissioned and/or otherwise cease operation to free up resource(s) of the unprotected virtual resource that may be used to restart the HA application executing on the protected virtual resource.

In some examples, the topology handler circuitry 330 modifies protection states of virtual resources in response to a successful migration-based upgrade. For example, in response to a successful transfer of data from (i) a first VM (or a first container) having a first protection state of protected to (ii) a second VM (or a second container) having a second protection state of unprotected, the topology handler circuitry 330 can modify the first and second protection states. In some such examples, the topology handler circuitry 330 may adjust the first protection state from protected to unprotected and the second protection state from unprotected to protected. For example, the topology handler circuitry 330 may change the second protection state from unprotected to protected because the second VM may gain control of the execution of the HA application from the first VM and thereby the first VM no longer needs to be protected because the first VM is no longer executing the HA application.

In the illustrated example of FIG. 3, the application upgrader circuitry 300 includes the data synchronization circuitry 340 to transfer data from a first virtual resource, such as a first VM or a first container, to a second virtual resource, such as a second VM, during an upgrade of an HA application being executed by the first VM (or to be executed by the first VM). For example, the data synchronization circuitry 340 may transfer data associated with the HA application, which may include one or more databases, one or more programs, etc., that, when executed or invoked, may execute the HA application.

In response to a successful transfer of the data, the topology handler circuitry 330 may identify new protection states for the first VM (or the first container) and the second VM (or the second container). In some examples, the data synchronization circuitry 340 synchronizes the migration data associated with the virtual server rack 106 to identify the second VM as the protected VM. For example, the data synchronization circuitry 340 can synchronize the migration data by storing the migration data in the datastore 370 as at least one of the protection states 372, the preemption data 374, the priority dependencies 376, or the failover rules 378. For example, in response to the identification of the new protection states, the data synchronization circuitry 340 may store the new protection states in the datastore 370 as the protection states 372. In some such examples, the data synchronization circuitry 340 may store updates to the preemption pair(s) included in the preemption data 374. In some examples, the data synchronization circuitry 340 modifies the priority dependencies 376 to change an order of restarts of virtual resources based on the second VM being identified as the protected VM and the first VM being identified as the unprotected VM.

In some examples, the data synchronization circuitry 340 stores a first association of a first protection state and a second protection state. For example, in response to triggering a migration-based upgrade, the data synchronization circuitry 340 may identify the first protection state of the first VM as protected and the second protection state of the second VM as unprotected. In some such examples, the data synchronization circuitry 340 may generate a first association of the first protection state of the first VM and the second protection state of the second VM as a first preemption pair. The data synchronization circuitry 340 may store the first preemption pair as the preemption data 374.

In some examples, the data synchronization circuitry 340 stores a second association of the first protection state and the second protection state. For example, in response to successfully executing the migration-based upgrade, the data synchronization circuitry 340 may identify the first protection state of the first VM as unprotected and the second protection state of the second VM as protected. In some such examples, the data synchronization circuitry 340 may generate a second association of the first protection state of the first VM and the second protection state of the second VM as a second preemption pair. The data synchronization circuitry 340 may store the second preemption pair as the preemption data 374.

In some examples, the data synchronization circuitry 340 replaces the first association with the second association. For example, the data synchronization circuitry 340 may replace the first preemption pair with the second preemption pair in the preemption data 374. In some examples, the data synchronization circuitry 340 persists the replacement within the virtual server rack 106 to synchronize the migration data. For example, the data synchronization circuitry 340 may propagate the changes to the preemption data 374 within the virtual server rack 106 to synchronize different versions of the preemption data 374 in different datastores, databases, etc., that include the different versions of the preemption data 374 to merge, converge, etc., to the same version. In some examples, the data synchronization circuitry 340 completes a migration-based upgrade. For example, in response to causing the different versions of the preemption data 374 to be synchronized, the data synchronization circuitry 340 may complete the migration-based upgrade of the HA application.

In the illustrated example of FIG. 3, the application upgrader circuitry 300 includes the resource decommission circuitry 350 to spin down, shutdown, and/or otherwise decommission one or more virtual resources (e.g., one or more VMs, one or more containers, etc., and/or combination(s) thereof). In some examples, the resource decommission circuitry 350 triggers a shutdown of a first VM (or a first container) during a migration-based upgrade. For example, in response to a successful migration of data from the first VM to a second VM (or a second container), the resource decommission circuitry 350 may instruct the first VM to shutdown and/or otherwise cease operation. In some such examples, the resource decommission circuitry 350 may identify one or more resources (e.g., CPU, memory, storage, etc.) utilized by the first VM to be available to compose different virtual resource(s). For example, the resource decommission circuitry 350 may return the one or more resources to the shared pool of configurable computing resources of the physical racks 102, 104 of FIG. 1.

In some examples, in response to a failure of a first VM (or a first container) during a migration-based upgrade of the first VM, the resource decommission circuitry 350 may decommission a second VM (or a second container) to release resources associated with the second VM for the first VM failover. For example, in response to a determination that the first VM is a protected VM and the second VM is an unprotected VM, the resource decommission circuitry 350 may decompose or dismantle the second VM to free up resources for an HA application executed by the first VM to restart on the freed-up resources. In some examples, in response to a failure of a VM different from the protected VM and the unprotected VM during a migration-based upgrade of the protected VM, the resource decommission circuitry 350 may decommission the unprotected VM to release resources associated with the unprotected VM for the failover of the failed VM.

In the illustrated example of FIG. 3, the application upgrader circuitry 300 includes the fault management circuitry 360 to identify a failure of at least one of a first virtual resource, such as a first VM or a second container, or a second virtual resource, such as a second VM or a second container, during a migration-based upgrade of an HA application executed by the first VM. For example, the fault management circuitry 360 may identify that the first VM and/or the second VM failed during a transfer of data from the first VM to the second VM. In some examples, the fault management circuitry 360 determines that a third VM separate from the first VM and/or the second VM has failed during the migration-based upgrade. For example, the third VM may be instantiated to execute one or more portions of the HA application, execute one or more routines or workloads that is/are dependent on the HA application, etc., and/or a combination thereof.

In some examples, in response to identifying that at least one of the first VM or the second VM failed during the migration-based upgrade, the fault management circuitry 360 restores the first VM, the second VM, and/or, more generally, the virtual server rack 106, based on one or more of the failover rules 378. In some examples, in response to a successful transfer of data from the first VM to the second VM, the fault management circuitry 360 may complete the migration-based upgrade of the HA application by updating the failover rules 378 based on the successful transfer of the data. For example, in response to identifying the first VM as an unprotected VM and the second VM as a protected VM, the fault management circuitry 360 may update one or more of the failover rules 378 based on prioritizing a failover of the second VM over unprotected virtual resources.

In some examples, the fault management circuitry 360 determines whether a first VM and/or a first container failed during a migration-based upgrade of a HA application to a second VM and/or a second container. For example, in response to a determination that the first VM failed, the fault management circuitry 360 can terminate an application executing on the second VM for the first VM failover. For example, the fault management circuitry 360 may inspect and/or otherwise analyze one or more failover rules. In some such examples, the fault management circuitry 360 may determine based on the failover rules that the second VM is unprotected and thereby the application instantiated on the second VM may be terminated. In some examples, the fault management circuitry 360 can restart the HA application on the second VM to restore the virtual server rack. For example, in response to the termination of the application on the second VM, the fault management circuitry 360 may failover the first VM by restarting the HA application on the second VM to restore the virtual server rack 106 of FIGS. 1 and/or 2.

In the illustrated example of FIG. 3, the application upgrader circuitry 300 includes the datastore 370 to record data. In the illustrated example, the datastore 370 records migration data, which includes the protection states 372, the preemption data 374, the priority dependencies 376, and/or the failover rules 378. The datastore 370 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 370 may additionally or alternatively be implemented by one or more double data rate (DDR) memories, such as DDR, DDR2, DDR3, DDR4, mobile DDR (mDDR), etc. The datastore 370 may additionally or alternatively be implemented by one or more mass storage devices such as HDD(s), SSD(s), compact disk (CD) drive(s), digital versatile disk (DVD) drive(s), etc. While in the illustrated example the datastore 370 is illustrated as a single datastore, the datastore 370 may be implemented by any number and/or type(s) of datastores. Furthermore, the data stored in the datastore 370 may be in any data format such as, for example, binary data, comma delimited data, tab delimited data, structured query language (SQL) structures, numerical values, string data, etc.

In the illustrated example of FIG. 3, the resource identification circuitry 310, the resource deployment circuitry 320, the topology handler circuitry 330, the data synchronization circuitry 340, the resource decommission circuitry 350, the fault management circuitry 360, and/or the example datastore 370 are in communication with the bus 380. For example, the bus 380 can be implemented by at least one of an Inter-Integrated Circuit (I2C) bus, a Serial Peripheral Interface (SPI) bus, or a Peripheral Component Interconnect (PCI) bus. Additionally or alternatively, the bus 380 may implement any other type of computing or electrical bus.

In some examples, the apparatus includes means for identifying an HA slot in a virtual server rack. For example, the means for identifying may be implemented by the resource identification circuitry 310. In some examples, the resource identification circuitry 310 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least block 702 of FIG. 7A, blocks 732, 752 of FIG. 7B, blocks 802, 814, 820 of FIG. 8, and/or block 902 of FIG. 9. In some examples, the resource identification circuitry 310 may be instantiated by hardware logic circuitry, which may be implemented by an ASIC or the FPGA circuitry 1200 of FIG. 12 structured to perform operations corresponding to the machine readable instructions. Additionally or alternatively, the resource identification circuitry 310 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the means for identifying includes means for determining to, in response to a second identification of a failure of a third virtual machine to execute a third application, determine whether one or more first resources are available to failover the third application.

In some examples, the apparatus includes means for deploying a second VM in the HA slot. For example, the means for deploying may be implemented by the resource deployment circuitry 320. In some examples, the resource deployment circuitry 320 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least block 704 of FIG. 7A, block 734 of FIG. 7B, blocks 804, 816 of FIG. 8, and/or block 904 of FIG. 9. In some examples, the resource deployment circuitry 320 may be instantiated by hardware logic circuitry, which may be implemented by an ASIC or the FPGA circuitry 1200 of FIG. 12 structured to perform operations corresponding to the machine readable instructions. Additionally or alternatively, the resource deployment circuitry 320 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the apparatus includes means for identifying the second VM as an unprotected VM. For example, the means for identifying may be implemented by the topology handler circuitry 330. In some examples, the topology handler circuitry 330 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least block 736, 738 of FIG. 7B and/or blocks 906, 912 of FIG. 9. In some examples, the topology handler circuitry 330 may be instantiated by hardware logic circuitry, which may be implemented by an ASIC or the FPGA circuitry 1200 of FIG. 12 structured to perform operations corresponding to the machine readable instructions. Additionally or alternatively, the topology handler circuitry 330 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the identifying of the second VM is in response to the deployment of the second VM in the HA slot, and the second virtual machine is to not be restarted in response to a failure of the second virtual machine when identified as the unprotected virtual machine. In some examples, the means for identifying includes means for generating the migration data to include a first identification of the first virtual machine as the protected virtual machine and a second identification of the second virtual machine as the unprotected virtual machine. In some examples, the means for identifying is to, in response to the deployment of the second virtual machine in the high availability slot, identify a first protection state of the first virtual machine as protected and a second protection state of the second virtual machine as unprotected.

In some examples, the apparatus includes means for transferring data from the first VM to the second VM. For example, the means for transferring may be implemented by the data synchronization circuitry 340. In some examples, the data synchronization circuitry 340 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least blocks 706, 710 of FIG. 7A, blocks 740, 748, 750 of FIG. 7B, block 822 of FIG. 8, and/or blocks 908, 914, 916, 918, 920 of FIG. 9. In some examples, the data synchronization circuitry 340 may be instantiated by hardware logic circuitry, which may be implemented by an ASIC or the FPGA circuitry 1200 of FIG. 12 structured to perform operations corresponding to the machine readable instructions. Additionally or alternatively, the data synchronization circuitry 340 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate. In some examples, the means for transferring includes means for synchronizing migration data associated with the virtual server rack to identify the second VM as the protected VM.

In some examples, the means for transferring includes means for storing in a datastore a first association of (i) the first protection state of the first virtual machine and (ii) the second protection state of the second virtual machine. In some examples, the means for storing is to, in response to the trigger of the shutdown of the first virtual machine, store in the datastore a second association of (i) the first protection state of the first virtual machine as unprotected and (ii) the second protection state of the second virtual machine as protected. In some examples, the means for storing is to replace the first association with the second association to synchronize the migration data.

In some examples, the apparatus includes means for triggering a shutdown of the first VM. For example, the means for triggering may be implemented by the resource decommission circuitry 350. In some examples, the resource decommission circuitry 350 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least block 708 of FIG. 7A, block 746 of FIG. 7B, block 818 of FIG. 8, and/or block 910 of FIG. 9. In some examples, the resource decommission circuitry 350 may be instantiated by hardware logic circuitry, which may be implemented by an ASIC or the FPGA circuitry 1200 of FIG. 12 structured to perform operations corresponding to the machine readable instructions. Additionally or alternatively, the resource decommission circuitry 350 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the apparatus includes means for terminating an HA application on the second VM for a first VM failover. For example, the means for terminating may be implemented by the fault management circuitry 360. In some examples, the fault management circuitry 360 may be instantiated by processor circuitry, which may be implemented by the example processor circuitry 1012 of FIG. 10 and/or the example processor circuitry 1100 of FIGS. 11 and/or 12 executing machine executable instructions such as that implemented by at least blocks 742, 744 of FIG. 7B, blocks 806, 808, 810, 812, 816, 818, 820 of FIG. 8, and/or block 920 of FIG. 9. In some examples, the fault management circuitry 360 may be instantiated by hardware logic circuitry, which may be implemented by an ASIC or the FPGA circuitry 1200 of FIG. 12 structured to perform operations corresponding to the machine readable instructions. Additionally or alternatively, the fault management circuitry 360 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the means for terminating includes means for restarting the first application on the second virtual machine in the high availability slot to restore the virtual server rack. In some examples, the means for restarting is to, in response to a second identification of a failure of the first virtual machine prior to the deployment of the second virtual machine, restart the first application on a third virtual machine in the high availability slot.

In some examples, the means for terminating is to, in response to a third identification of the failure of the first virtual machine after the deployment of the second virtual machine, terminate a second application on the second virtual machine. In some examples, the means for restarting is to restart the first application on the second virtual machine in the high availability slot.

While an example manner of implementing the application upgrader 214 of FIG. 2 is illustrated in connection with the application upgrader circuitry 300 of FIG. 3, one or more of the elements, processes, and/or devices illustrated in FIG. 3 may be combined, divided, re-arranged, omitted, eliminated, and/or implemented in any other way. Further, the example resource identification circuitry 310, the example resource deployment circuitry 320, the example topology handler circuitry 330, the example data synchronization circuitry 340, the example resource decommission circuitry 350, the example fault management circuitry 360, the example datastore 370, the example protection states 372, the example preemption data 374, the example priority dependencies 376, the example failover rules 378, the example bus 380, and/or, more generally, the example application upgrader 214 of FIG. 2, may be implemented by hardware alone or by hardware in combination with software and/or firmware. Thus, for example, any of the example resource identification circuitry 310, the example resource deployment circuitry 320, the example topology handler circuitry 330, the example data synchronization circuitry 340, the example resource decommission circuitry 350, the example fault management circuitry 360, the example datastore 370, the example protection states 372, the example preemption data 374, the example priority dependencies 376, the example failover rules 378, the example bus 380, and/or, more generally, the example application upgrader 214, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example application upgrader 214 of FIG. 2 may include one or more elements, processes, and/or devices in addition to, or instead of, those illustrated in FIG. 3, and/or may include more than one of any or all of the illustrated elements, processes and devices.

Figure 4:
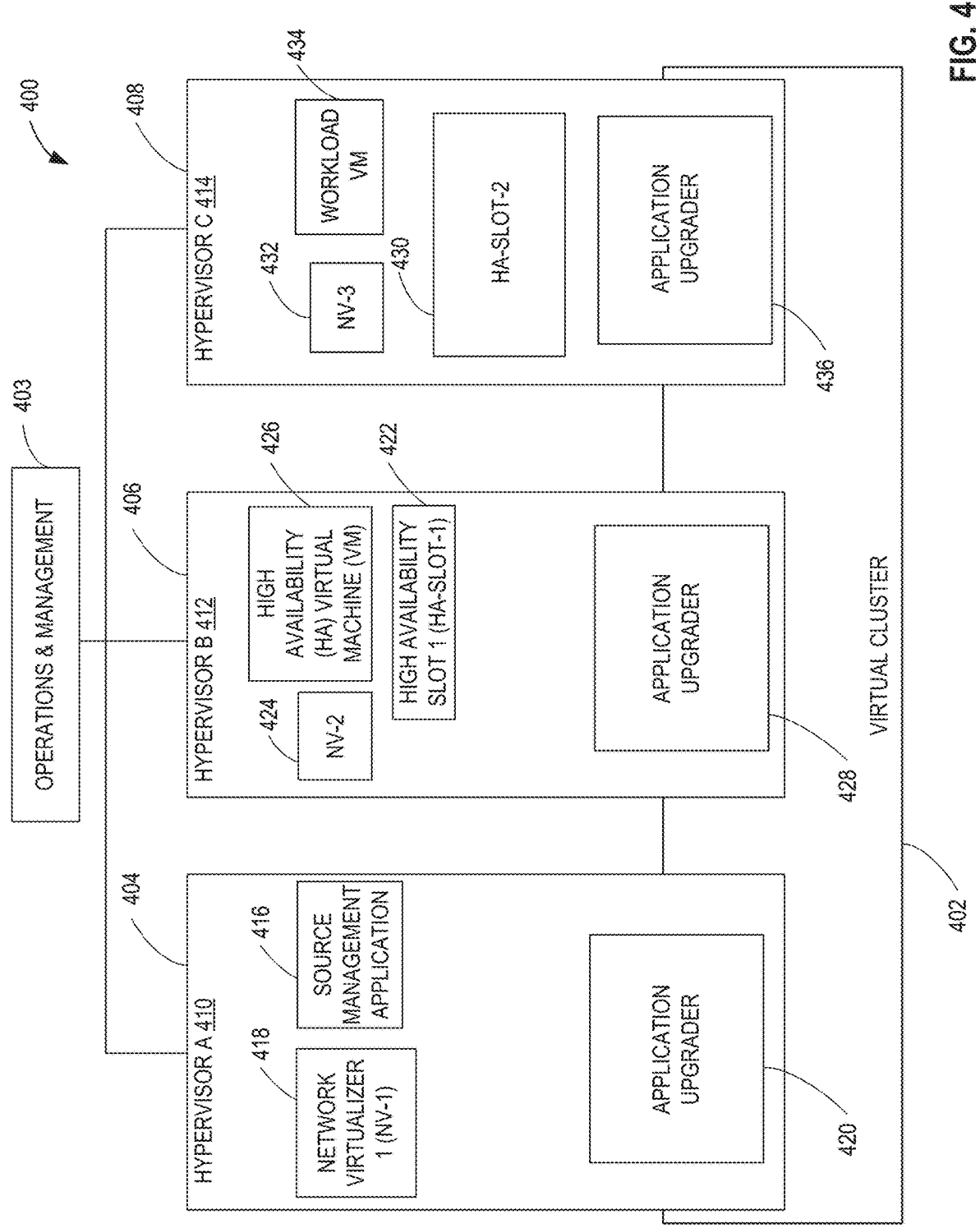
FIG. 4 is a block diagram of an example implementation of an example three node cluster.

FIG. 4 is a block diagram of an example implementation of a virtualized environment 400 including an example cluster 402 (identified as VIRTUAL CLUSTER) in communication with an example operations and management layer 403. For example, the operations and management layer 403 may be implemented by the operations and management layer 206 of FIG. 2. In some examples, the cluster 402 may implement the cluster 130A, 130B of FIG. 1. For example, the cluster 402 may implement a VMWARE® ESXI™ cluster. In this example, the cluster 402 implements and/or otherwise includes three example nodes 404, 406, 408. For example, the cluster 402 of FIG. 4 may implement a three-node virtual cluster.

The nodes 404, 406, 408 include a first example node 404, a second example node 406, and a third example node 408. In this example, the nodes 404, 406, 408 are implemented by respective example hypervisors 410, 412, 414 including a first example hypervisor 410, a second example hypervisor 412, and a third example hypervisor 414. For example, the hypervisors 410, 412, 414 may implement ESXI™ hypervisors.

The first hypervisor 410 of the illustrated example instantiates and/or otherwise includes an example source management application 416, a first example network virtualizer 418 (identified by NV-1), and a first example application upgrader 420. The second hypervisor 412 of the illustrated example instantiates and/or otherwise includes a first example high available slot 422 (identified by HA-SLOT-1), a second example network virtualizer 424 (identified by NV-2), an example high availability (HA) virtual machine (VM) 426, and a second example application upgrader 428. The third hypervisor 414 of the illustrated example instantiates and/or otherwise includes a second example high availability slot 430 (identified by HA-SLOT-2), a third example network virtualizer 432 (identified by NV-3), an example workload VM 434, and a third example application upgrader 436.

In the illustrated example, the source management application 416 is executing on a VM. For example, the first hypervisor 410 may instantiate a VM and install the source management application 416 on the VM. In some examples, the source management application 416 is a collection of components that setup and manage the cluster 402. For example, the source management application 416 may be implemented by the VMWARE® VSPHERE® virtualization suite, or portion(s) thereof. Alternatively, the source management application 416 may be implemented by any other type of virtualization software.

In the illustrated example, the first network virtualizer 418, the second network virtualizer 424, and/or the third network virtualizer 432 may each be executing on a VM. For example, the first hypervisor 410 may instantiate a VM and install the first network virtualizer 418 on the VM. In some examples, the second hypervisor 412 may instantiate a VM and install the second network virtualizer 424 on the VM. In some examples, the third hypervisor 414 may instantiate a VM and install the third network virtualizer 432 on the VM.

The first network virtualizer 418, the second network virtualizer 424, and/or the third network virtualizer 432 deploy and manage virtualized network resources across the cluster 402. For example, the first network virtualizer 418, the second network virtualizer 424, and/or the third network virtualizer 432 may be implemented by the network virtualizer 212 of FIG. 2. In some such examples, the first network virtualizer 418, the second network virtualizer 424, and/or the third network virtualizer 432 may be implemented using a VMWARE® NSX™ network virtualization platform that includes a number of components including a VMWARE® NSX™ network virtualization manager.

The workload VM 434 is a VM that is executing a workload, such as function(s), routine(s), etc., associated with an application. HA-SLOT-1 422 and HA-SLOT-2 430 are reserved slots that may be idle in preparation for a failover event from a virtual resource, such as a VM or container, executing a HA application. The HA VM 426 is a VM instantiated to execute in an HA mode configuration. For example, the HA VM 426 may execute an HA application, or portion(s) thereof. In some such examples, in response to a failure of the HA VM 426, the second application upgrader 428 may failover the HA VM 426 by spinning up an instance of the HA VM 426 in the HA-SLOT-1 and restarting the HA application on the instance of the HA VM 426 in the HA-SLOT-1.

In the illustrated example, the first application upgrader 420, the second application upgrader 428, and the third application upgrader 436 are instances of each other. For example, the first application upgrader 420, the second application upgrader 428, and the third application upgrader 436 may be implemented by the application upgrader 214 of FIG. 2 and/or the application upgrader circuitry 300 of FIG. 3. Alternatively, one or more of the first application upgrader 420, the second application upgrader 428, and/or the third application upgrader 436 may be different from each other.

Figure 5:
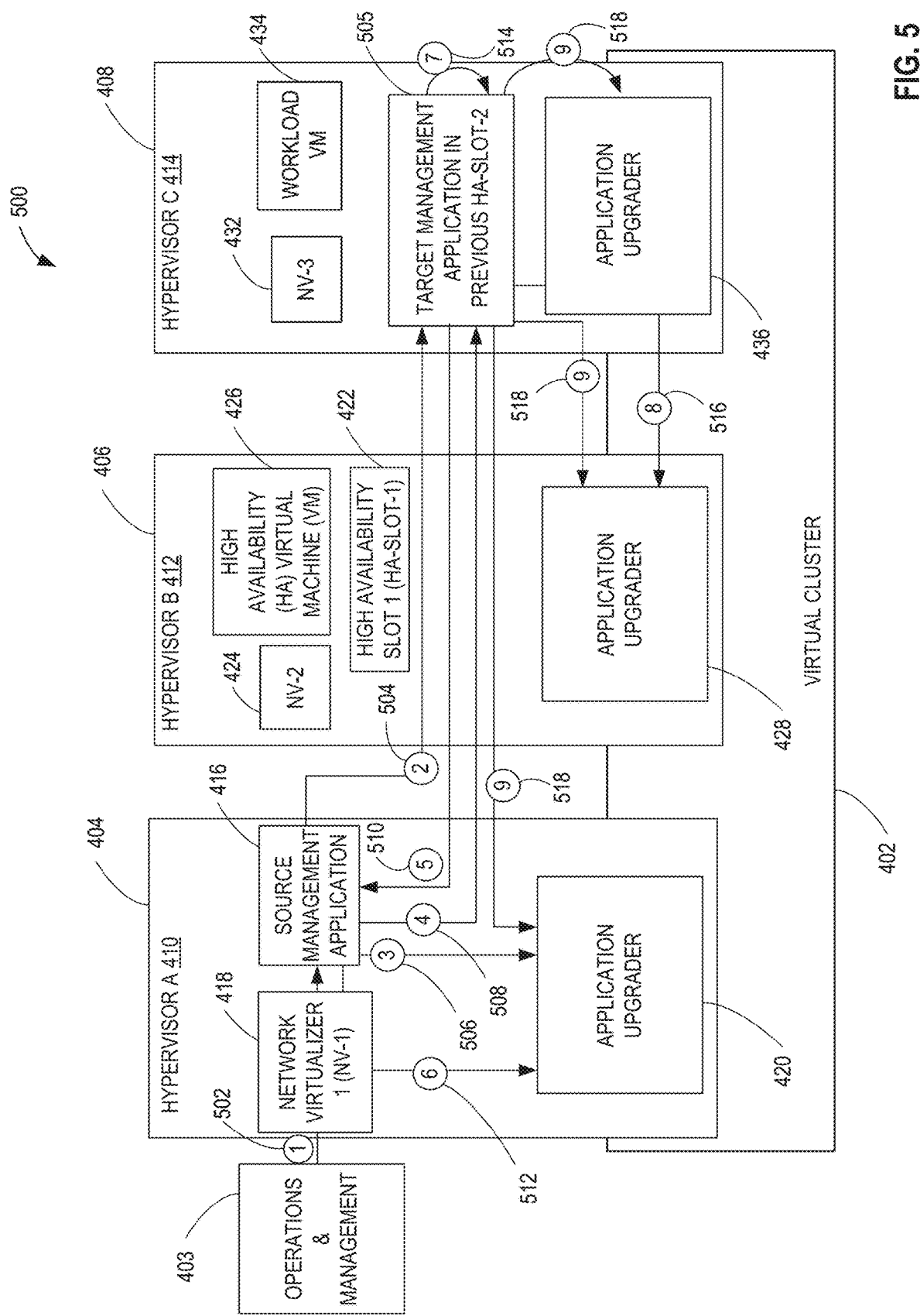
FIG. 5 is an example workflow corresponding to example operations of the example three node cluster of FIG. 4.

FIG. 5 is an example workflow 500 corresponding to example operation of the cluster 402 of FIG. 4. During a first example operation 502, the operations and management layer 403 initiates, initializes, triggers, and/or otherwise invokes a migration-based upgrade of a HA application, such as the source management application 416. For example, a user, a computing device associated with the user, etc., may generate and transmit a command through the first network virtualizer 418 to the source management application 416. In some such examples, the command can indicate and/or otherwise instruct the source management application 416 to begin a migration-based upgrade of the source management application 416 from a first version to a second version. In some examples, the resource identification circuitry 310 may receive the command and initiate the migration-based upgrade based on the command.

During a second example operation 504, the source management application 416 deploys an example target management application 505 in the HA-SLOT-2 430 of FIG. 4. For example, the target management application 505 can be an upgraded or newer version of the source management application 416. In some such examples, the source management application 416 may be an application having a first version and the target management application 505 may be the application having a second version, which may be newer than the first version.

Prior to the second operation 504, the HA-SLOT-2 430 may be utilized to failover the source management application 416 from the first node 404 to the third node 408. During the second operation 504, the source management application 416 may identify a first protections state of the source management application 416 as protected and a second protection state of the target management application 505 as unprotected. In some examples, the resource deployment circuitry 320 may deploy the target management application 505 in the HA-SLOT-2 430. In some examples, the topology handler circuitry 330 may identify a first protections state of the source management application 416 as protected and a second protection state of the target management application 505 as unprotected.

During a third example operation 506, the source management application 416 stores migration data in the first application upgrader 420. For example, the source management application 416 may store migration data including the first protection state and the second protection state in the first application upgrader 420. In some such examples, the source management application 416 may store migration data including a preemption pair of the source management application 416 and the target management application 505 in the first application upgrader 420. In some examples, the topology handler circuitry 330 may store the first protection state and the second protection state in the datastore 370 as the protection states 372. In some such examples, the topology handler circuitry 330 may store migration data including a preemption pair of the source management application 416 and the target management application 505 in the first application upgrader 420 as the preemption data 374.

During a fourth example operation 508, the target management application 505 triggers a synchronization of data from the source management application 416. For example, the target management application 505 may alert the source management application 416 that the target management application 505 is instantiated and ready to receive a transfer of application data from the source management application 416. In some examples, the data synchronization circuitry 340 may trigger a transfer of data from the source management application 416 to the target management application 505.

During a fifth example operation 510, the target management application 505 triggers a shutdown sequence of the source management application 416. In some examples, the triggering of the shutdown sequence of the source management application 416 may implement an atomic switchover point at which the target management application 505 becomes the management application in charge of managing the cluster 402. For example, the atomic switchover point may be a time during the workflow 500 at which the protection states of the source management application 416 and the target management application 505 are changed to identify the transition of control of the cluster 402 from the source management application 416 to the target management application 505. In the illustrated example, in response to a successful transfer of application data from the source management application 416 to the target management application 505, the target management application 505 may instruct the source management application 416 to shutdown and release its resources (e.g., hardware, software, and/or firmware resources, physical and/or virtual resources, etc.) for other computational purposes. In some examples, the resource decommission circuitry 350 may trigger the shutdown sequence of the source management application 416.

During a sixth example operation 512, the source management application 416 updates the migration data stored by the first application upgrader 420. For example, the source management application 416 may update the first protection state of the source management application 416 to unprotected and the second protection state of the target management application 505 to protected. In some examples, the topology handler circuitry 330 may update the migration data in the datastore 370.

During a seventh example operation 514, the target management application 505 completes the migration-based upgrade. For example, the target management application 505 may update the migration data stored in the third application upgrader 436. In some such examples, the target management application 505 may update the first protection state of the source management application 416 to unprotected and the second protection state of the target management application 505 to protected. In some examples, the topology handler circuitry 330 may update at least one of the protection states 372, the preemption data 374, the priority dependencies 376, or the failover rules 378 in the datastore 370.

During an eighth example operation 516, the target management application 505 may trigger a cleanup operation of migration-based upgrade data to indicate an end to the migration-based upgrade. For example, the target management application 505 may delete extraneous information associated with the migration-based upgrade stored by the second application upgrader 428. In some examples, the data synchronization circuitry 340 may execute the cleanup operation of the migration-based upgrade data.

During a ninth example operation 518, the target management application 505 synchronizes data across the first application upgrader 420, the second application upgrader 428, and the third application upgrader 436. For example, the target management application 505 may push migration data stored in the third application upgrader 436 to at least one of the first application upgrader 420 or the second application upgrader 428. In some examples, the data synchronization circuitry 340 may transmit update(s) to at least one of the protection states 372, the preemption data 374, the priority dependencies 376, or the failover rules 378 based on the completion of the migration-based upgrade of the HA application from the first version to the second version. In some such examples, the topology handler circuitry 330 may push updates to at least one of the protection states 372, the preemption data 374, the priority dependencies 376, or the failover rules 378 in the datastore 370 to one or more different datastores to synchronize the migration data stored by the datastore 370 and the one or more different datastores. In response to completion of the ninth operation 518, the workflow 500 concludes. In some examples, in response to another command from the operations and management layer 403, the workflow 500 may be re-executed to update another HA application in the cluster 402.

Figure 6:
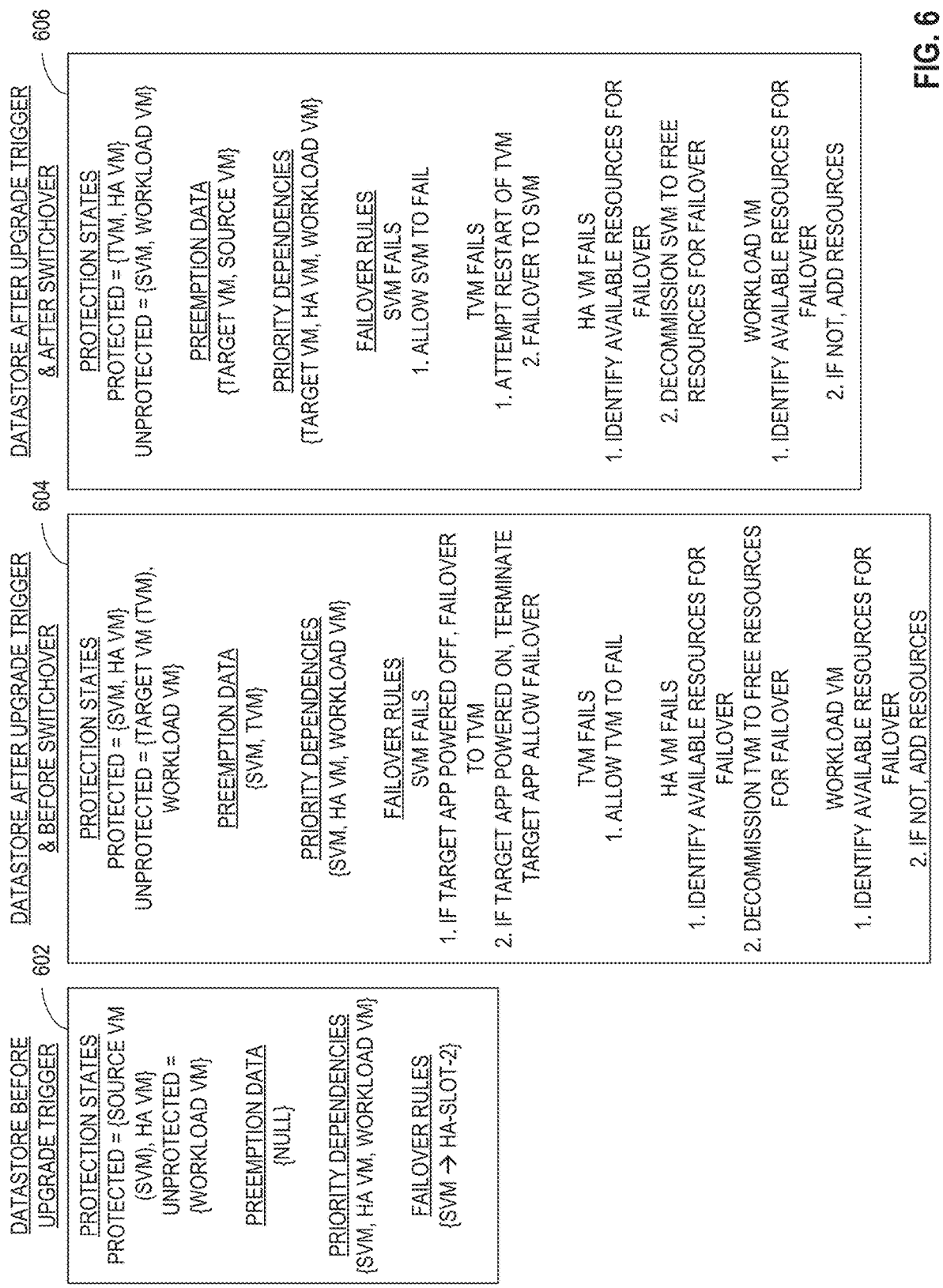
FIG. 6 is an example implementation of the example datastore of FIG. 3.

FIG. 6 is an illustration of a first example datastore 602, a second example datastore 604, and a third example datastore 606. In some examples, the first datastore 602, the second datastore 604, and/or the third datastore 606 may be an example implementation of the datastore 370 of FIG. 3. For example, the protection states included in the first datastore 602, the second datastore 604, and/or the third datastore 606 may be example implementation(s) of the protection states 372 of FIG. 3. In some examples, the preemption data included in the first datastore 602, the second datastore 604, and/or the third datastore 606 may be example implementation(s) of the preemption data 374 of FIG. 3. In some examples, the priority dependencies included in the first datastore 602, the second datastore 604, and/or the third datastore 606 may be example implementation(s) of the priority dependencies 376 of FIG. 3. In some examples, the failover rules included in the first datastore 602, the second datastore 604, and/or the third datastore 606 may be example implementation(s) of the failover rules 378 of FIG. 3.

The first datastore 602 of the illustrated example may implement a datastore before an upgrade trigger (e.g., a trigger of a migration-based upgrade) is generated. For example, the first datastore 602 may be representative of data stored in at least one of the first application upgrader 420, the second application upgrader 428, or the third application upgrader 436 prior to the first operation 502 of FIG. 5. In some such examples, prior to the first operation 502, the protection state of a source VM, which may execute the source management application 416, is protected and the protection state of the workload VM 434 is unprotected. In the illustrated example, the priority dependencies identify that the source VM is to be started (or restarted) prior to the HA VM 426, and the HA VM 426 is to be started (or restarted) prior to the workload VM 434. In the illustrated example, the failover rules indicate that in response to a failure of the source VM, the source management application 416 is to be restarted on a VM in the HA SLOT 430.

The second datastore 604 of the illustrated example may implement a datastore after the upgrade trigger is generated and before an atomic switchover event. For example, the second datastore 604 may be representative of data stored in at least one of the first application upgrader 420, the second application upgrader 428, or the third application upgrader 436 prior to the fifth operation 510 of FIG. 5. In some such examples, after the first operation 502 and prior to the fifth operation 510, the protection state of the source VM and the HA VM 426 is protected and the protection state of a target VM, which may be instantiated in the HA-SLOT-2 430 to implement the target management application 505 of FIG. 5, is unprotected. In the illustrated example, the preemption data includes a preemption pair of the source VM and the target VM. In the illustrated example, the priority dependencies identify that the source VM is to be started (or restarted) prior to the HA VM 426, and the HA VM is to be started (or restarted) prior to the workload VM 434.

In the illustrated example, the failover rules indicate that in response to a failure (e.g., a failure during a migration-based upgrade) of the source VM, a determination is to be made whether the target management application 505 on the target VM is powered off or on. For example, the fault management circuitry 360 may failover the source VM to the target VM in response to a determination that the target management application 505 is powered off and/or otherwise has not been instantiated. In some examples, the fault management circuitry 360 may terminate the target management application 505 to free up resources to failover the source VM to the target VM in response to a determination that the target management application 505 is powered on and/or otherwise instantiated. In some examples, the fault management circuitry 360 may allow the target VM to fail in response to an identification of the protection state of the target VM as unprotected.

In the illustrated example, the fault management circuitry 360 may execute failover operations in response to a failure (e.g., a failure during a migration-based upgrade) of the HA VM 426 based on the failover rules in the second datastore 604. For example, in response to the failure of the HA VM 426, the fault management circuitry 360 may invoke the resource identification circuitry 310 to identify available resources for the failover of the HA VM 426. In some such examples, in response to a determination that there are insufficient available resources for the failover of the HA VM 426, the fault management circuitry 360 may instruct the resource decommission circuitry 350 to decommission the target VM to free resources for the failover of the HA VM 426 because the target VM is unprotected.

In the illustrated example, the fault management circuitry 360 may execute failover operations in response to a failure (e.g., a failure during a migration-based upgrade) of the workload VM 434 based on the failover rules in the second datastore 604. For example, in response to the failure of the workload VM 434, the fault management circuitry 360 may invoke the resource identification circuitry 310 to identify available resources for the failover of the workload VM 434. In some such examples, in response to a determination that there are insufficient available resources for the failover of the workload VM 434, the fault management circuitry 360 may instruct the resource deployment circuitry 320 to add resources to the cluster 402 to effectuate the failover of the workload VM 434.

The third datastore 606 of the illustrated example may implement a datastore after the upgrade trigger is generated and after the atomic switchover event. For example, the third datastore 606 may be representative of data stored in at least one of the first application upgrader 420, the second application upgrader 428, or the third application upgrader 436 after the fifth operation 510 of FIG. 5. In some such examples, after the fifth operation 510, the protection state of the target VM and the HA VM 426 is protected and the protection state of the source VM is unprotected. In the illustrated example, the preemption data includes an update to the preemption pair of the second datastore 604 by switching the placements of the source VM and the target VM to indicate that the source VM is unprotected and the target VM is protected. In the illustrated example, the priority dependencies identify that the target VM is to be started (or restarted) prior to the HA VM 426, and the HA VM is to be started (or restarted) prior to the workload VM 434.

In the illustrated example, the failover rules indicate that in response to a failure (e.g., a failure during a migration-based upgrade) of the source VM, the fault management circuitry 360 may allow the source VM to fail in response to an identification of the protection state of the source VM as unprotected.

In the illustrated example, the fault management circuitry 360 may execute failover operations in response to a failure (e.g., a failure during a migration-based upgrade) of the target VM based on the failover rules in the third datastore 606. For example, in response to a failure of the target VM, the fault management circuitry 360 may attempt to restart the target VM and, if not successful, may failover the target VM to the source VM because the source VM is unprotected.

In the illustrated example, the fault management circuitry 360 may execute failover operations in response to a failure (e.g., a failure during a migration-based upgrade) of the HA VM 426 based on the failover rules in the third datastore 606. For example, in response to the failure of the HA VM 426, the fault management circuitry 360 may invoke the resource identification circuitry 310 to identify available resources for the failover of the HA VM 426. In some such examples, in response to a determination that there are insufficient available resources for the failover of the HA VM 426, the fault management circuitry 360 may instruct the resource decommission circuitry 350 to decommission the source VM to free resources for the failover of the HA VM 426 because the source VM is unprotected.

In the illustrated example, the fault management circuitry 360 may execute failover operations in response to a failure (e.g., a failure during a migration-based upgrade) of the workload VM 434 based on the failover rules in the second datastore 604. For example, in response to the failure of the workload VM 434, the fault management circuitry 360 may invoke the resource identification circuitry 310 to identify available resources for the failover of the workload VM 434. In some such examples, in response to a determination that there are insufficient available resources for the failover of the workload VM 434, the fault management circuitry 360 may instruct the resource deployment circuitry 320 to add resources to the cluster 402 to effectuate the failover of the workload VM 434.

Flowcharts representative of example hardware logic circuitry, machine readable instructions, hardware implemented state machines, and/or any combination thereof for implementing the application upgrader 214 of FIG. 2, the application upgrader circuitry 300 of FIG. 3, the first application upgrader 420 of FIGS. 4 and/or 5, the second application upgrader 428 of FIGS. 4 and/or 5, and/or the third application upgrader 436 of FIGS. 4 and/or 5 are shown in FIGS. 7A-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, an HDD, an SSD, a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7A-9, many other methods of implementing the application upgrader 214 of FIG. 2, the application upgrader circuitry 300 of FIG. 3, the first application upgrader 420 of FIGS. 4 and/or 5, the second application upgrader 428 of FIGS. 4 and/or 5, and/or the third application upgrader 436 of FIGS. 4 and/or 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7A-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7A:
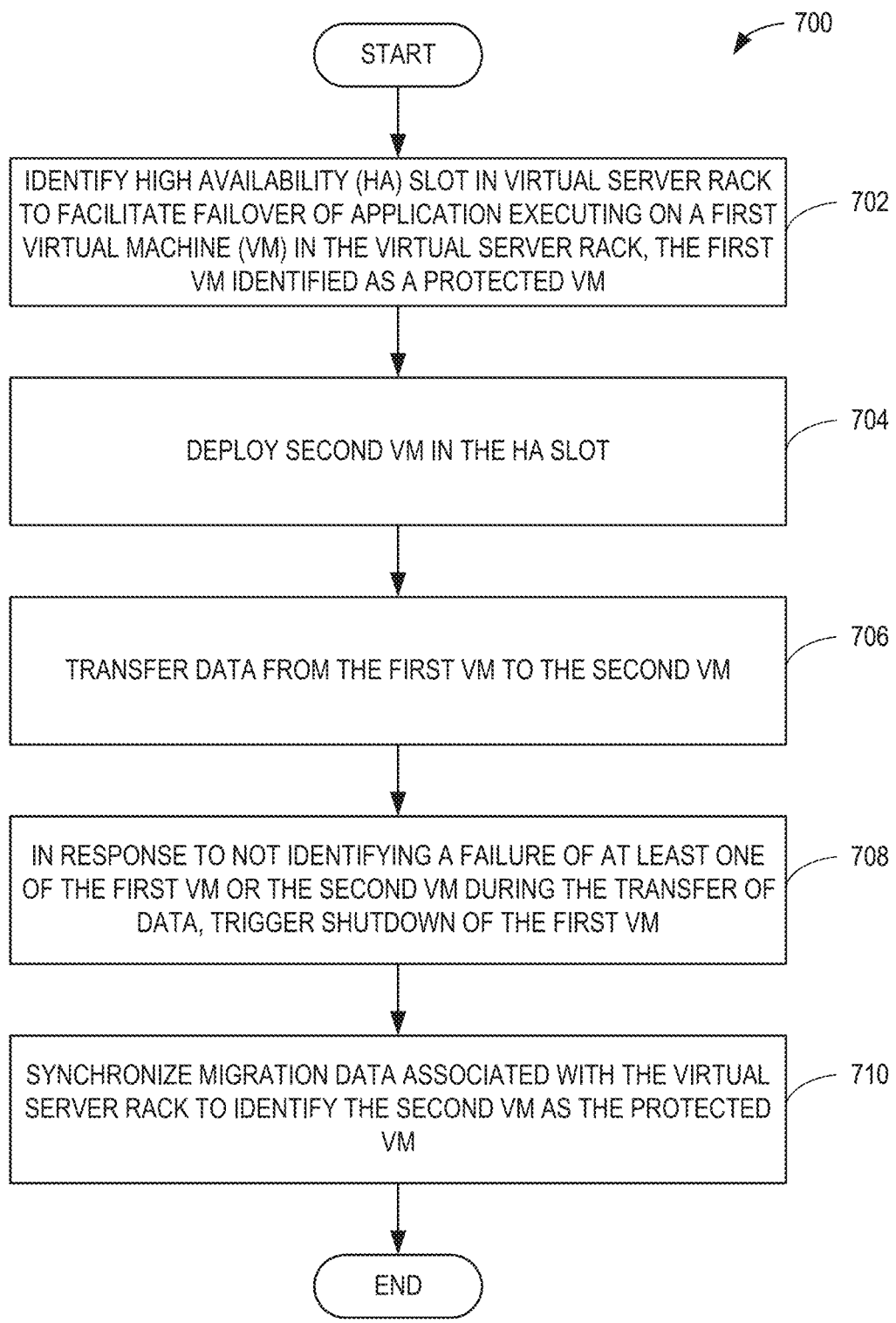
FIG. 7A is a flowchart representative of example machine readable instructions and/or example operations that may be executed and/or instantiated by example processor circuitry to achieve high availability virtual resource migration.

FIG. 7A is a flowchart representative of example machine readable instructions and/or example operations 700 that may be executed and/or instantiated by processor circuitry to achieve high availability virtual resource migration. For example, the machine readable instructions and/or example operations 700 that may be executed and/or instantiated by processor circuitry to achieve high availability virtual resource migration of an application that is distributed in one or more VMs, one or more containers, etc., and/or combination(s) thereof. The machine readable instructions and/or the operations 700 of FIG. 7A begin at block 702, at which the application upgrader 214 identifies a high availability (HA) slot in a virtual server rack to facilitate a failover of an application executing on a first virtual machine (VM) in the virtual server rack, the first VM identified as a protected VM. For example, the resource identification circuitry 310 (FIG. 3) may identify a first VM (or a first container) operating in a HA mode configuration. In some such examples, the resource identification circuitry 310 may determine that the first VM is to execute the source management application 416. In some such examples, the resource identification circuitry 310 may determine that the HA-SLOT-2 430 of FIG. 4 is reserved to receive a failover of the first VM. Additionally or alternatively, the resource identification circuitry 310 may determine that the HA-SLOT-2 4230 is reserved to receive a failover of a container.

At block 704, the application upgrader 214 deploys a second VM in the HA slot. For example, the resource deployment circuitry 320 (FIG. 3) may instantiate a second VM (or a second container) in the HA-SLOT-2 and provision the target management application 505 to the second VM. In some such examples, the target management application 505 may be an upgraded or newer version of the source management application 416.

At block 706, the application upgrader 214 transfers data from the first VM to the second VM. For example, the data synchronization circuitry 340 (FIG. 3) may initiate a transfer of application data associated with the source management application 416 from the first VM to the target management application 505 on the second VM.

At block 708, in response to not identifying a failure of at least one of the first VM or the second VM during the transfer of data, the application upgrader 214 triggers a shutdown of the first VM. For example, the resource decommission circuitry (350) FIG. 3 may trigger a shutdown sequence of the first VM.

At block 710, the application upgrader 214 synchronizes migration data associated with the virtual server rack to identify the second VM as the protected VM. For example, the data synchronization circuitry 340 may change the first protection state of the first VM from protected to unprotected and the second protection state of the second VM from unprotected to protected. In some such examples, the data synchronization circuitry 340 may store the changes to the protection states 372 and/or the preemption data 374 in the datastore 370. In response to synchronizing the migration data associated with the virtual server rack to identify the second VM as the protected VM at block 710, the machine readable instructions and/or the operations 730 conclude.

Figure 7B:
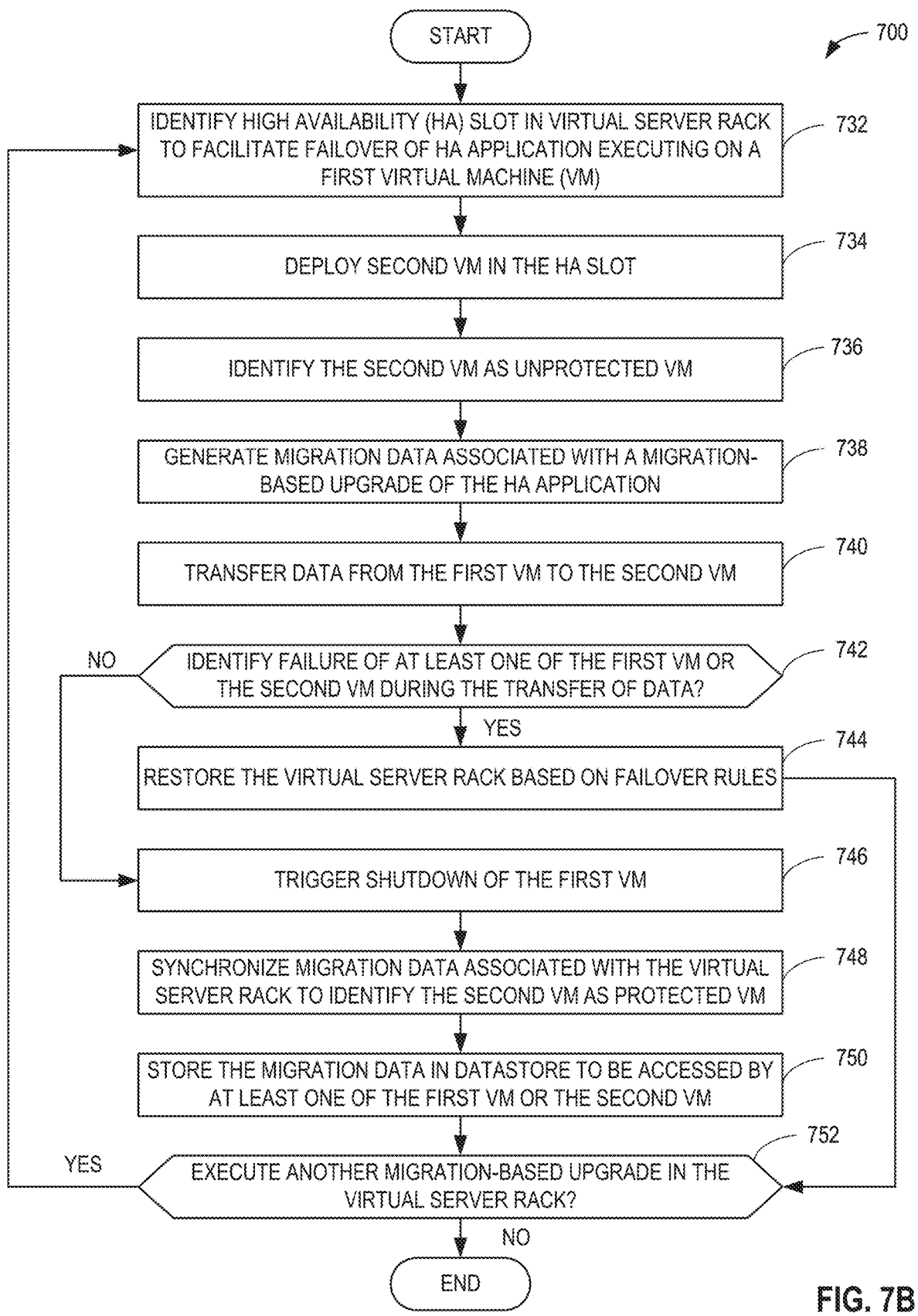
FIG. 7B is another flowchart representative of example machine readable instructions and/or example operations that may be executed and/or instantiated by example processor circuitry to achieve high availability virtual resource migration.

FIG. 7B is a flowchart representative of example machine readable instructions and/or example operations 730 that may be executed and/or instantiated by processor circuitry to achieve high availability virtual resource migration. For example, the machine readable instructions and/or example operations 730 that may be executed and/or instantiated by processor circuitry to achieve high availability virtual resource migration of an application that is distributed in one or more VMs, one or more containers, etc., and/or combination(s) thereof. The machine readable instructions and/or the operations 730 of FIG. 7B begin at block 732, at which the application upgrader 214 identifies a high availability (HA) slot in a virtual server rack to facilitate a failover of an application executing on a first virtual machine (VM). For example, the resource identification circuitry 310 (FIG. 3) may identify a first VM (or a first container) operating in a HA mode configuration. In some such examples, the resource identification circuitry 310 may determine that the first VM is to execute the source management application 416. In some such examples, the resource identification circuitry 310 may determine that the HA-SLOT-2 430 of FIG. 4 is reserved to receive a failover of the first VM. Additionally or alternatively, the resource identification circuitry 310 may determine that the HA-SLOT-2 4230 is reserved to receive a failover of a container.

At block 734, the application upgrader 214 deploys a second VM in the HA slot. For example, the resource deployment circuitry 320 (FIG. 3) may instantiate a second VM (or a second container) in the HA-SLOT-2 and provision the target management application 505 to the second VM. In some such examples, the target management application 505 may be an upgraded or newer version of the source management application 416.

At block 736, the application upgrader 214 identifies the second VM as an unprotected VM. For example, the topology handler circuitry 330 (FIG. 3) may identify a first protection state of the first VM as protected and a second protection state of the second VM as unprotected.

At block 738, the application upgrader 214 generates migration data associated with a migration-based upgrade of the HA application. For example, the topology handler circuitry 330 may generate the migration data associated with upgrading the source management application 416. In some such examples, the topology handler circuitry 330 may generate the migration data to include at least one of the protection states 372, the preemption data 374, the priority dependencies 376, or the failover rules 378. In some such examples, the topology handler circuitry 330 may store the migration data in the datastore 370 (FIG. 3).

At block 740, the application upgrader 214 transfers data from the first VM to the second VM. For example, the data synchronization circuitry 340 (FIG. 3) may initiate a transfer of application data associated with the source management application 416 from the first VM to the target management application 505 on the second VM.

At block 742, the application upgrader 214 identifies whether a failure of at least one of the first VM or the second VM during the transfer of data has occurred. For example, the fault management circuitry 360 (FIG. 3) may determine whether at least one of the first VM, the source management application 416, the second VM, or the target management application 505 has failed during the migration-based upgrade of the source management application 416.

If, at block 742, the application upgrader 214 identifies a failure of at least one of the first VM or the second VM during the transfer of data, then, at block 744, the application upgrader 214 restores the virtual server rack based on failover rules. For example, the fault management circuitry 360 may terminate the target management application 505 based on the failover rules 378 (FIG. 3). In some such examples, the fault management circuitry 360 may determine to terminate the target management application 505 based on the failover rules included in the second datastore 604 of FIG. 6. In some such examples, in response to the termination, the fault management circuitry 360 may failover the first VM to the second VM. For example, the fault management circuitry 360 may cause the source management application 416 to restart on the second VM. In response to restoring the virtual server rack based on the failover rules at block 744, control proceeds to block 752 to determine whether to continue monitoring the virtual server rack.

If, at block 742, the application upgrader 214 does not identify a failure of at least one of the first VM or the second VM during the transfer of data, control proceeds to block 746 to trigger a shutdown of the first VM. For example, the resource decommission circuitry (350) FIG. 3 may trigger a shutdown sequence of the first VM.

At block 748, the application upgrader 214 synchronizes migration data associated with the virtual server rack to identify the second VM as a protected VM. For example, the data synchronization circuitry 340 may change the first protection state of the first VM from protected to unprotected and the second protection state of the second VM from unprotected to protected. In some such examples, the data synchronization circuitry 340 may store the changes to the protection states 372 and/or the preemption data 374 in the datastore 370.

At block 750, the application upgrader 214 stores the migration data in a datastore to be accessed by at least one of the first VM or the second VM. For example, the data synchronization circuitry 340 may store the changes to the protection states 372 and/or the preemption data 374 in the datastore 370. In some examples, the data synchronization circuitry 340 may store the changes to the protection states 372 and/or the preemption data 374 in a first datastore of the first application upgrader 420, a second datastore of the second application upgrader 428, a third datastore of the third application upgrader 436, or any other datastore to which the first VM and/or the second VM have access.

At block 752, the application upgrader 214 determines whether to execute another migration-based upgrade in the virtual server rack. For example, the resource identification circuitry 310 may determine that another migration-based upgrade is to be executed based on a command, an instruction, etc., obtained from an operations and management layer, such as the operations and management layer 206 of FIG. 2, the operations and management layer 403 of FIGS. 4 and/or 5, etc.

If, at block 752, the application upgrader 214 determines to execute another migration-based upgrade in the virtual server rack, control returns to block 732, otherwise the machine readable instructions and/or the operations 730 conclude.

Figure 8:
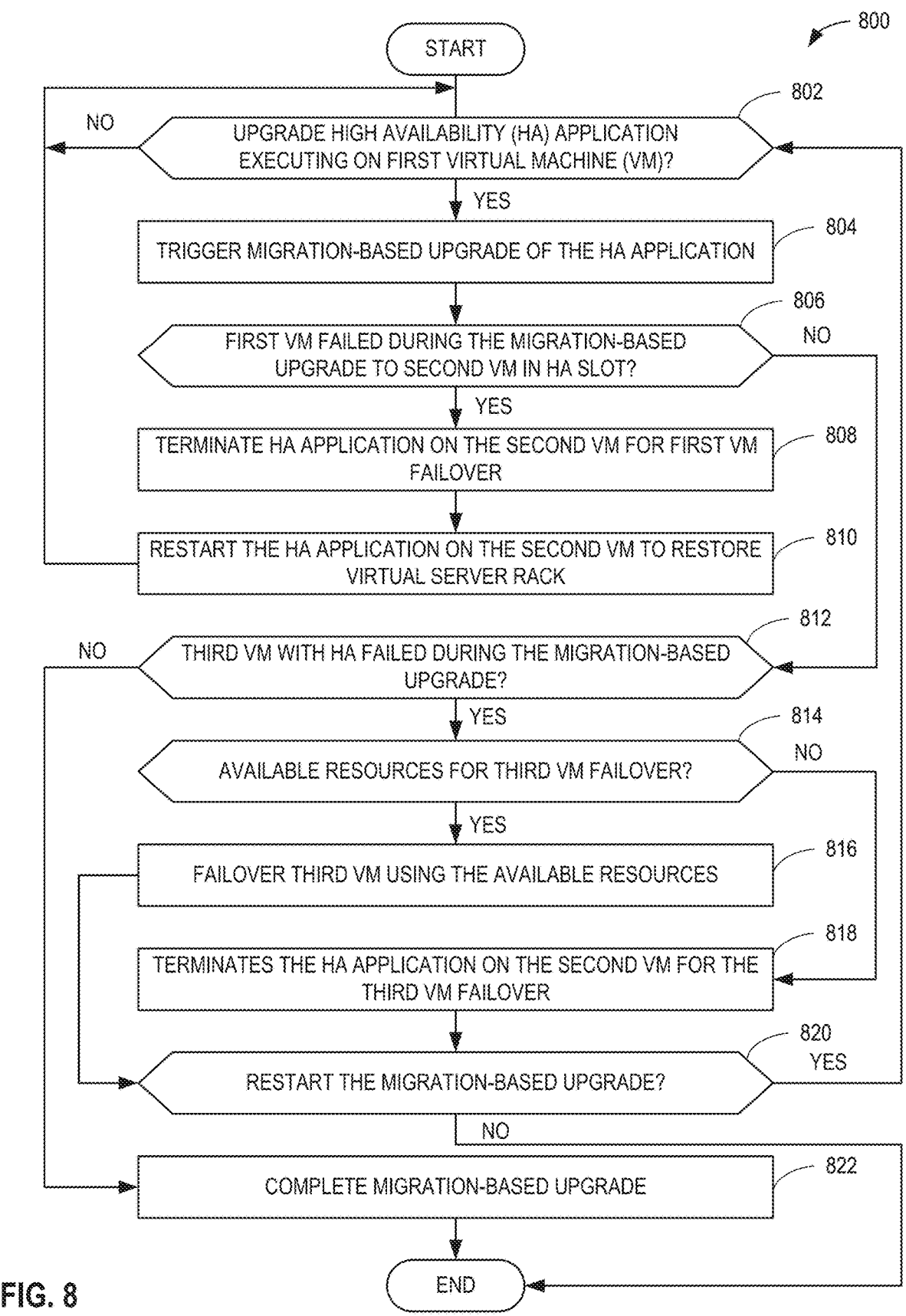
FIG. 8 is a flowchart representative of example machine readable instructions and/or example operations that may be executed and/or instantiated by example processor circuitry to high availability virtual resource migration based on example failover rules.

FIG. 8 is a flowchart representative of example machine readable instructions and/or example operations 800 that may be executed and/or instantiated by processor circuitry to achieve high availability virtual resource migration based on example failover rules. The machine readable instructions and/or the operations 800 of FIG. 8 begin at block 802, at which the application upgrader 214 determines whether to upgrade a high availability (HA) application executing on a first virtual machine (VM). For example, the resource identification circuitry 310 (FIG. 3) may obtain a command from the operations and management layer 206 of FIG. 2, the operations and management layer 403 of FIGS. 4 and/or 5, etc. In some such examples, the resource identification circuitry 310 may determine that the command is to invoke and/or otherwise set in motion a migration-based upgrade of an HA application executing on a first VM or a first container, such as the source management application 416 of FIG. 4 executing on a first VM of the first hypervisor 410.

If, at block 802, the application upgrader 214 determines not to upgrade the HA application executing on the first VM, control waits until an indication to upgrade the HA application is received. If, at block 802, the application upgrader 214 determines to upgrade the HA application executing on the first VM, then, at block 804, the application upgrader 214 triggers a migration-based upgrade of the HA application. For example, the resource deployment circuitry 320 (FIG. 3) may trigger the migration-based upgrade of the source management application 416 by instantiating a second VM or a second container in the HA-SLOT-2 430. In some such examples, the resource deployment circuitry 320 may instantiate the target management application 505, which may be an upgraded version of the source management application 416.

At block 806, the application upgrader 214 determines whether the first VM failed during the migration-based upgrade to a second VM in an HA slot. For example, the fault management circuitry 360 (FIG. 3) may determine that at least one of the first VM or the source management application 416 failed during the migration-based upgrade.

If, at block 806, the application upgrader 214 determines that the first VM did not fail during the migration-based upgrade to the second VM in the HA slot, control proceeds to block 812 to determine whether a third VM with HA failed during the migration-based upgrade. For example, in response to identifying a non-failure of the first VM during the migration-based upgrade to the second VM in the HA slot, control proceeds to block 812.

If, at block 806, the application upgrader 214 determines that the first VM failed during the migration-based upgrade to the second VM in the HA slot, then, at block 808, the application upgrader 214 terminates a HA application on the second VM for the first VM failover. For example, the fault management circuitry 360 may inspect and/or otherwise analyze the failover rules of the second datastore 604 of FIG. 6. In some such examples, the fault management circuitry 360 may determine based on the failover rules that the second VM is unprotected and thereby the target management application 505 instantiated on the second VM may be terminated.

At block 810, the application upgrader 214 restarts the HA application on the second VM to restore the virtual server rack. For example, in response to the termination, the fault management circuitry 360 may failover the first VM by restarting the source management application 416 on the second VM to restore the cluster 402, and/or, more generally, the virtual server rack 106 of FIGS. 1 and/or 2.

At block 812, the application upgrader 214 determines whether a third VM with HA failed during the migration-based upgrade. For example, the fault management circuitry 360 may determine that the HA VM 426 of FIG. 4 failed during the migration-based upgrade. In some such examples, the fault management circuitry 360 may determine that a virtual resource, such as the HA VM 426, failed because the virtual resource did not response to a ping, a request to execute a computing task, etc., failed to update a timer (e.g., a watch dog timer), etc., and/or a combination thereof.

If, at block 812, the application upgrader 214 determines that the third VM with HA did not fail during the migration-based upgrade, control proceeds to block 822 to complete the migration-based upgrade. For example, the data synchronization circuitry 340 (FIG. 3) may transfer the application data associated with the source management application 416 from the first VM to the second VM. In response to completing the migration-based upgrade at block 822, the example machine readable instructions and/or the example operations 800 conclude.

If, at block 812, the application upgrader 214 determines that the third VM with HA failed during the migration-based upgrade, then, at block 814, the application upgrader 214 determines whether there are available resources for the third VM failover. For example, the resource identification circuitry 310 may determine whether there is an HA slot associated with the HA VM 426. In some such examples, the resource identification circuitry 310 may identify that the HA-SLOT-1 422 is associated with the HA VM 426 and thereby determine that there are sufficient resources to facilitate the failover of the HA VM 426. In some examples, the resource identification circuitry 310 may determine whether the cluster 402 of FIG. 4 has sufficient resources that are not allocated to a workload domain that may be used to compose a VM to which the workload VM 434 may failover. For example, the resource identification circuitry 310 may determine whether the first cluster 402 has one or more resources available to failover an application executing on the workload VM 434.

If, at block 814, the application upgrader 214 determines that there are available resources for the third VM failover, then, at block 816, the application upgrader 214 failovers the third VM using the available resources. For example, the fault management circuitry 360 may failover the HA VM 426 to the HA-SLOT-1 422. In some examples, the resource deployment circuitry 320 may spin up a VM using available, non-allocated, etc., resources of the cluster 402. In some such examples, the fault management circuitry 360 may failover the HA VM 426 by restarting an application executed by the HA VM 426 on the newly spun up VM. In response to the failover of the third VM using the available resources at block 816, control proceeds to block 820 to determine whether to restart the migration-based upgrade.

If, at block 814, the application upgrader 214 determines that there are not available resources for the third VM failover, then, at block 818, the application upgrader 214 terminates the HA application on the second VM for the third VM failover. For example, the resource decommission circuitry 350 may terminate the target management application 505 in the HA-SLOT-2 430 because the second VM is unprotected. In some such examples, in response to the termination, the fault management circuitry 360 may restart the application, which is executing on the HA VM 426, on the second VM. In response to terminating the HA application on the second VM for the third VM failover at block 818, the application upgrader 214 determines whether to restart the migration-based upgrade at block 820. For example, the resource identification circuitry 310 may determine whether to restart the migration-based upgrade. In some such examples, the fault management circuitry 360 may transmit an alert to the operations and management layer 206, the operations and management layer 403, etc. In some such examples, the fault management circuitry 360 may generate the alert to indicate that the migration-based upgrade failed because one or more virtual resources failed. In some examples, in response to the transmission of the alert, the resource identification circuitry 310 may receive another command from the operations and management layer 206, the operations and management layer 403, etc., instructing the resource identification circuitry 310 to restart the migration-based upgrade.

If, at block 820, the application upgrader 214 determines to restart the migration-based upgrade, control returns to block 802 to upgrade the HA application executing on the first VM, otherwise the machine readable instructions and/or the operations 800 conclude.

Figure 9:
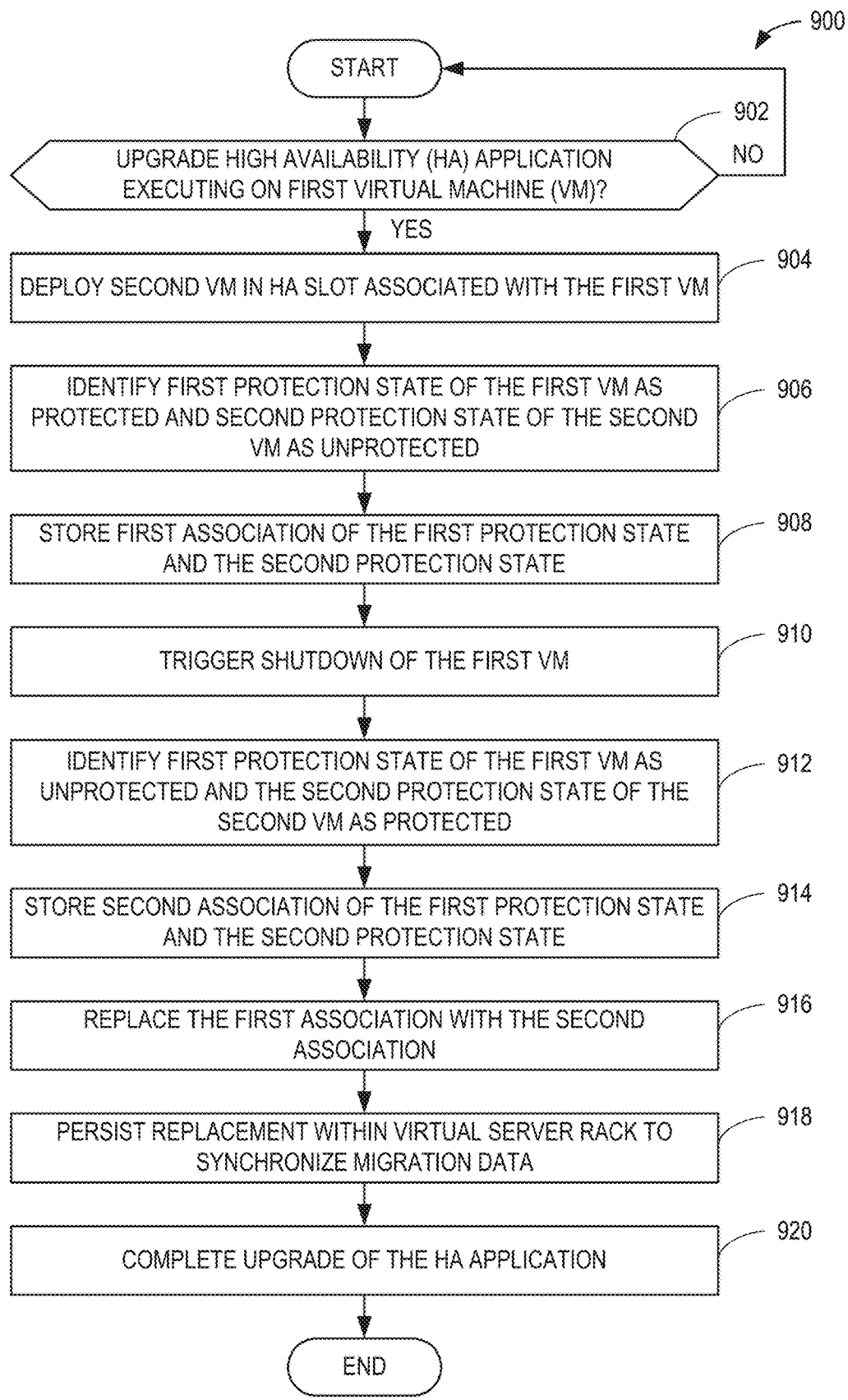
FIG. 9 is a flowchart representative of example machine readable instructions and/or example operations that may be executed and/or instantiated by example processor circuitry to synchronize migration data to achieve high availability virtual resource migration.

FIG. 9 is a flowchart representative of example machine readable instructions and/or example operations 900 that may be executed and/or instantiated by processor circuitry to synchronize migration data to achieve high availability virtual resource migration. The machine readable instructions and/or the operations 900 of FIG. 9 begin at block 902, at which the application upgrader 214 determines whether to upgrade a high availability (HA) application executing on a first virtual machine (VM). For example, the resource identification circuitry 310 (FIG. 3) may obtain a command from the operations and management layer 206 of FIG. 2, the operations and management layer 403 of FIGS. 4 and/or 5, etc. In some such examples, the resource identification circuitry 310 may determine that the command is to invoke and/or otherwise set in motion a migration-based upgrade of an HA application executing on a first VM or a first container, such as the source management application 416 of FIG. 4 executing on a first VM or a first container of the first hypervisor 410.

If, at block 902, the application upgrader 214 determines not to upgrade the HA application executing on the first VM, control waits until an indication to upgrade the HA application is received. If, at block 902, the application upgrader 214 determines to upgrade the HA application executing on the first VM, then, at block 904, the application upgrader 214 deploys a second VM in an HA slot associated with the first VM. For example, the resource deployment circuitry 320 (FIG. 3) may launch a second VM in the HA-SLOT-2 430 that is associated with the first VM executing the source management application 416. In some such examples, the resource deployment circuitry 320 may instantiate the target management application 505, which may be an upgraded version of the source management application 416, on the second VM.

At block 906, the application upgrader 214 identifies a first protection state of the first VM as protected and a second protection state of the second VM as unprotected. For example, the topology handler circuitry 330 (FIG. 3) may identify the first protection state of the first VM executing the source management application 416 as protected and the second protection state of the second VM to execute the target management application 505 as unprotected.

At block 908, the application upgrader 214 stores a first association of the first protection state and the second protection state. For example, the data synchronization circuitry 340 (FIG. 3) may store a first association of the first protection state and the second protection state in the datastore 370 (FIG. 3) as at least one of the protection states 372 (FIG. 3) or the preemption data 374 (FIG. 3).

At block 910, the application upgrader 214 triggers a shutdown of the first VM. For example, the resource decommission circuitry 350 (FIG. 3) may terminate the source management application 416 and initiate the shutdown of the first VM.

At block 912, the application upgrader 214 identifies the first protection state of the first VM as unprotected and the second protection state of the second VM as protected. For example, in response to the triggering of the shutdown of the first VM, the topology handler circuitry 330 may determine that the second VM is to execute the upgraded version of the source management application 416 and thereby control the cluster 402. In some such examples, the topology handler circuitry 330 may identify the first protection state of the first VM to be shutdown as unprotected and the second protection state of the second VM to execute the target management application 505 as protected.

At block 914, the application upgrader 214 stores a second association of the first protection state and the second protection state. For example, the data synchronization circuitry 340 may store the second association of the first protection state and the second protection state in the datastore 370 as at least one of the protection states 372 or the preemption data 374.

At block 916, the application upgrader 214 replaces the first association with the second association. For example, the data synchronization circuitry 340 may replace the first association with the second association in the datastore 370 to improve storage utilization of the datastore 370.

At block 918, the application upgrader 214 persists the replacement within a virtual server rack to synchronize migration data. For example, the data synchronization circuitry 340 may synchronize the migration data stored by at least one of the first application upgrader 420, the second application upgrader 428, or the third application upgrader 436 of FIG. 4.

At block 920, the application upgrader 214 completes the upgrade of the HA application. For example, the fault management circuitry 360 (FIG. 3) may complete the upgrade of the source management application 416 from a first version to a second version by updating at least one of the priority dependencies 376 or the failover rules 378 in the datastore 370 based on the upgrade. In some such examples, the data synchronization circuitry 340 may synchronize the priority dependencies 376 and/or the failover rules 378 stored by at least one of the first application upgrader 420, the second application upgrader 428, or the third application upgrader 436 of FIG. 4. In response to completing the upgrade of the HA application at block 920, the machine readable instructions and/or the operations 900 of FIG. 9 conclude.

Figure 10:
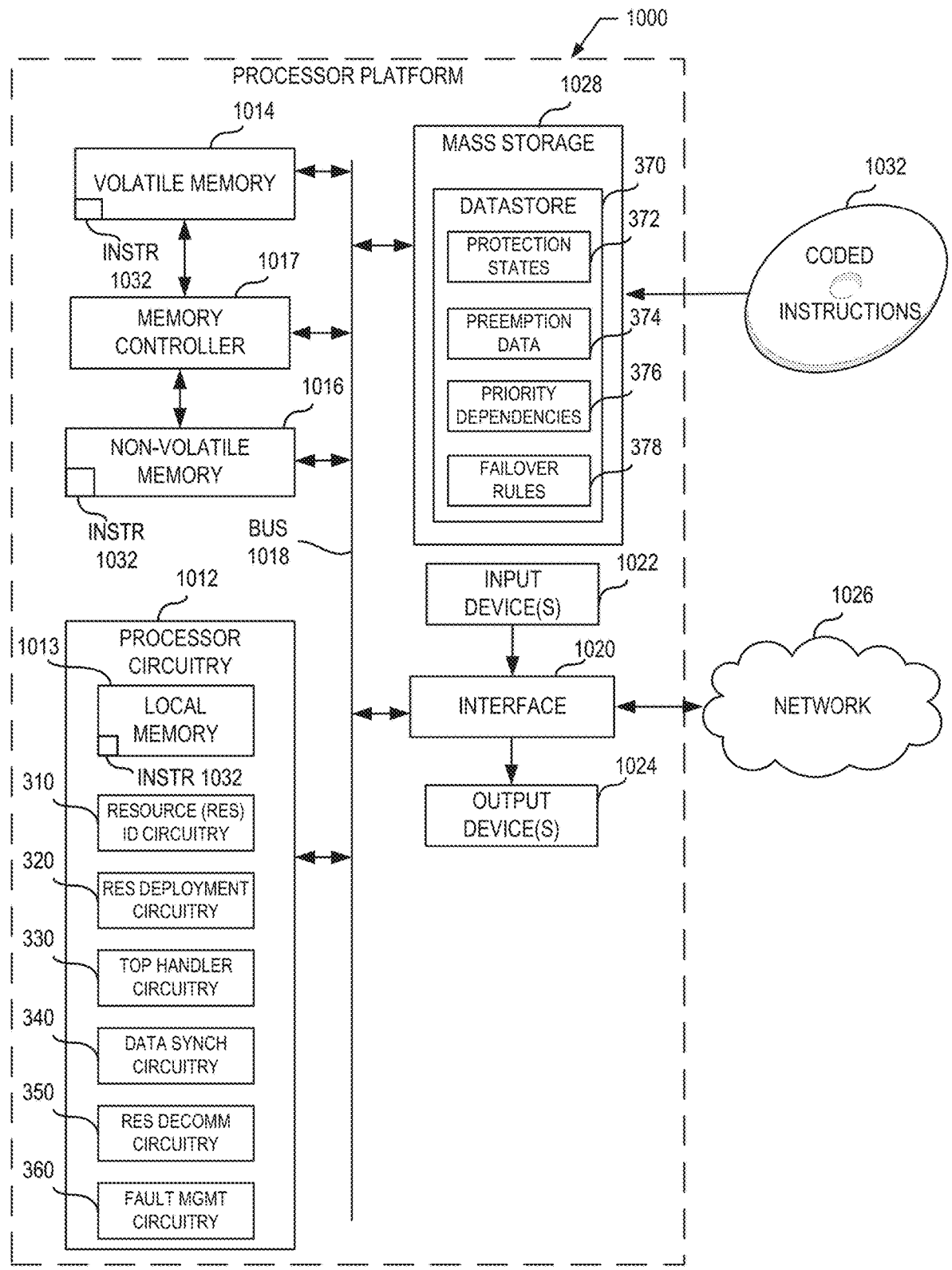
FIG. 10 is a block diagram of an example processing platform including processor circuitry structured to execute the example machine readable instructions of FIGS. 7A-9 to implement the example application upgrader of FIGS. 2 and/or 3.

FIG. 10 is a block diagram of an example processor platform 1000 structured to execute and/or instantiate the machine readable instructions and/or the operations of FIGS. 7A-9 to implement the application upgrader circuitry 300 of FIG. 3. The processor platform 1000 can be, for example, a server, a personal computer, a workstation, a self-learning machine (e.g., a neural network), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs micropro- cessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the resource identifi- cation circuitry 310 (identified by RESOURCE (RES) ID CIRCUITRY), the resource deployment circuitry 320 (iden- tified by RES DEPLOYMENT CIRCUITRY), the topology handler circuitry 330 (identified by TOP HANDLER CIR- CUITRY), the data synchronization circuitry 340 (identified by DATA SYNCH CIRCUITRY), the resource decommis- sion circuitry 350 (identified by RES DECOMM CIR- CUITRY), and the fault management circuitry 360 (identi- fied by FAULT MGMT CIRCUITRY) of FIG. 3.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. In this example, the bus 1018 implements the bus 380 of FIG. 3. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® inter- face, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or com- mands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connec- tion, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) sys- tems, solid state storage devices such as flash memory devices, and DVD drives. In this example, the one or more mass storage devices 1028 implement the datastore 370 of FIG. 3, which includes the protection states 372, the pre- emption data 374, the priority dependencies 376, and the failover rules 378 of FIG. 3.

The machine executable instructions 1032, which may be implemented by the machine readable instructions of FIGS. 7A-9, may be stored in the mass storage device 1028, in the volatile memory 1014, in the non-volatile memory 1016, and/or on a removable non-transitory computer readable storage medium such as a CD or DVD.

Figure 11:
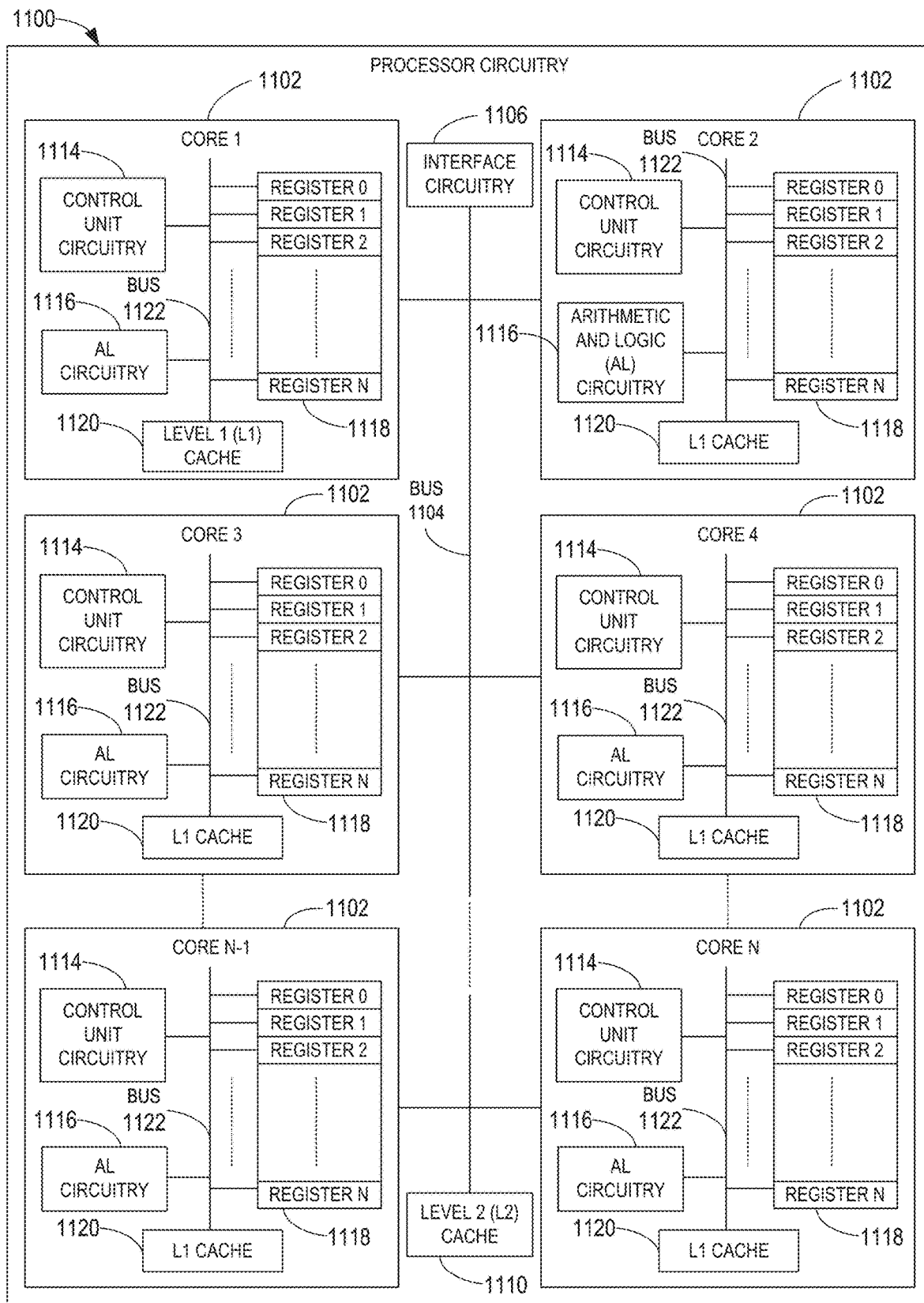
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semi- conductor device including N cores. The cores 1102 of the microprocessor 1100 may operate independently or may cooperate to execute machine readable instructions. For example, machine code corresponding to a firmware pro- gram, an embedded software program, or a software pro- gram may be executed by one of the cores 1102 or may be executed by multiple ones of the cores 1102 at the same or different times. In some examples, the machine code corre- sponding to the firmware program, the embedded software program, or the software program is split into threads and executed in parallel by two or more of the cores 1102. The software program may correspond to a portion or all of the machine readable instructions and/or the operations repre- sented by the flowcharts of FIGS. 7A-9.

The cores 1102 may communicate by a first example bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
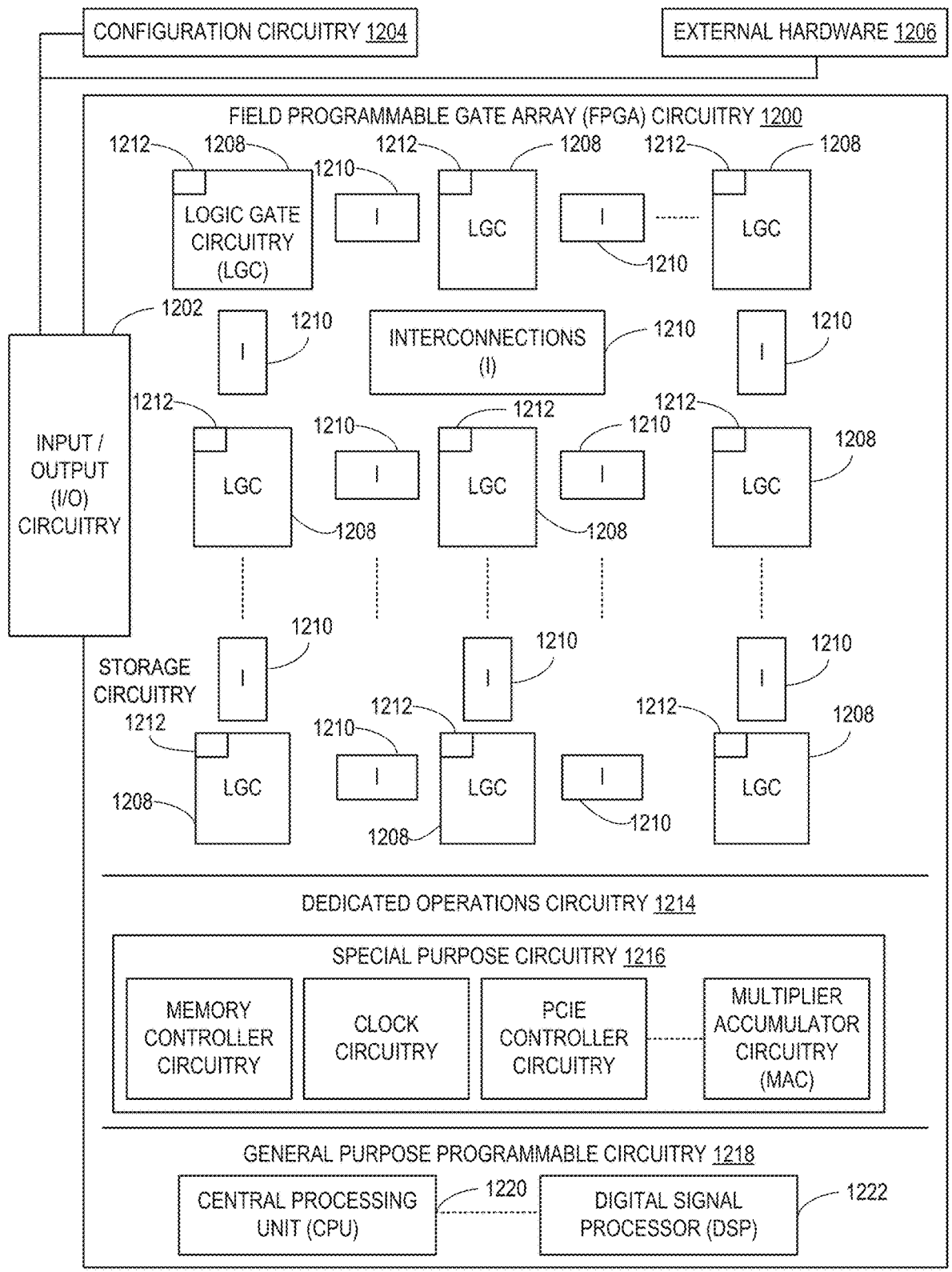
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7A-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7A-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7A-9. As such, the FPGA circuitry 1200 may be structured to effectively instantiate some or all of the machine readable instructions of the flowcharts of FIGS. 7A-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7A-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 7A-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7A-9 may be executed by one or more of the cores 1102 of FIG. 11 and a second portion of the machine readable instructions represented by the flowcharts of FIGS. 7A-9 may be executed by the FPGA circuitry 1200 of FIG. 12.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
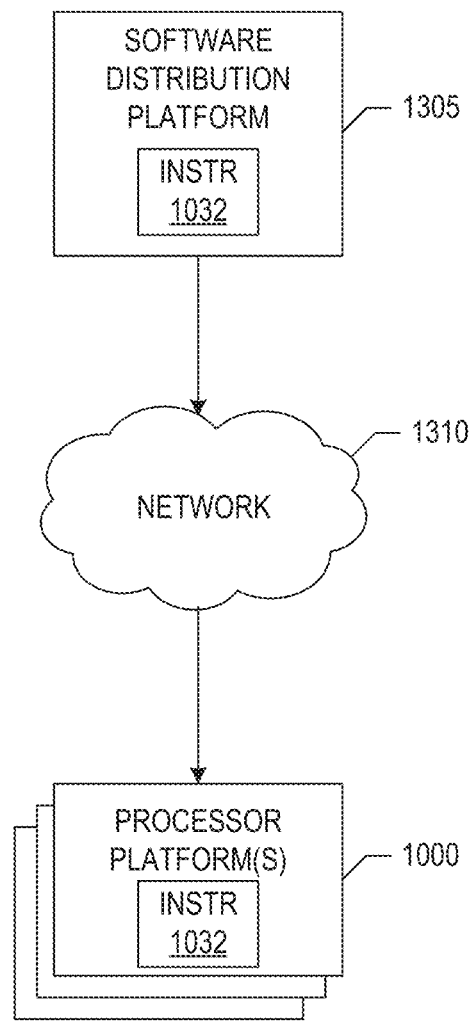
FIG. 13 is a block diagram of an example software distribution platform to distribute software to client devices associated with end users and/or consumers, and/or original equipment manufacturers (OEMs).

FIG. 13 is a block diagram of an example software distribution platform 1305, which may be implemented by one or more servers, to distribute software (e.g., software corresponding to the example machine readable instructions and/or the example operations of FIGS. 7A-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers). For example, the software distribution platform 1305 may distribute software such as the example machine readable instructions 1032 of FIG. 10 to hardware devices owned and/or operated by third parties. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions and/or the example operations 700, 730, 800, 900 of FIGS. 7A-9, as described above. The one or more servers of the example software distribution platform 1305 are in communication with a network 1310, which may correspond to any one or more of the Internet and/or any of the example networks 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions and/or the example operations 700, 730, 800, 900 of FIGS. 7A-9, may be downloaded to the example processor platform 1000, which is to execute the machine readable instructions 1032 to implement the example application upgrader circuitry 300 of FIG. 3. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed for high availability application migration in virtualized environments. Disclosed systems, methods, apparatus, and articles of manufacture improve the efficiency of using a computing device by using reserved slots for the deployment of target virtual resources (e.g., VMs, containers, etc.) and thereby achieving high availability application migration without requiring additional resources (e.g., CPU, storage, memory, etc.). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for high availability virtual resource migration are disclosed herein. Further examples and combinations thereof include the following:

Example 1 includes an apparatus for high availability application migration in a virtualized environment, the apparatus comprising at least one memory, instructions in the apparatus, and processor circuitry to at least one of execute or instantiate the instructions to identify a high availability slot in a virtual server rack, the high availability slot to facilitate a failover of an application executing on a first virtual machine in the virtual server rack, the first virtual machine identified as a protected virtual machine, deploy a second virtual machine in the high availability slot, transfer data from the first virtual machine to the second virtual machine, and in response to not identifying a failure of at least one of the first virtual machine or the second virtual machine during the transfer of the data trigger a shutdown of the first virtual machine, and synchronize migration data associated with the virtual server rack to identify the second virtual machine as the protected virtual machine.

Example 2 includes the apparatus of example 1, wherein the high availability slot is associated with at least one of a computing resource, a network resource, or a storage resource, and the high availability slot is reserved to facilitate the failover of the first virtual machine by restarting the first virtual machine using the at least one of the compute resource, the network resource, or the storage resource.

Example 3 includes the apparatus of example 1, wherein the identification is a first identification, and the processor circuitry is to at least one of instantiate or execute the instructions to in response to the deployment of the second virtual machine in the high availability slot, identify the second virtual machine as an unprotected virtual machine, the second virtual machine to not be restarted in response to a failure of the second virtual machine when identified as the unprotected virtual machine, generate the migration data to include a first identification of the first virtual machine as the protected virtual machine and a second identification of the second virtual machine as the unprotected virtual machine, and in response to a second identification of the second virtual machine as the protected virtual machine, store the migration data in a datastore to be accessed by at least one of the first virtual machine or the second virtual machine.

Example 4 includes the apparatus of example 1, wherein the identification is a first identification, the application is a first application having a first version, and the processor circuitry is to at least one of instantiate or execute the instructions to install a second application having a second version on the second virtual machine, in response to a second identification of a failure of the first virtual machine, terminate the second application, restart the first application on the second virtual machine in the high availability slot to restore the virtual server rack, and in response to the restore of the virtual server rack, restart an upgrade of the first application.

Example 5 includes the apparatus of example 1, wherein the identification is a first identification, the application is a first application, and the processor circuitry is to at least one of instantiate or execute the instructions to in response to a second identification of a failure of the first virtual machine prior to the deployment of the second virtual machine, restart the first application on a third virtual machine in the high availability slot, and in response to a third identification of the failure of the first virtual machine after the deployment of the second virtual machine terminate a second application on the second virtual machine, and restart the first application on the second virtual machine in the high availability slot.

Example 6 includes the apparatus of example 1, wherein the identification is a first identification, the application is a first application, the second virtual machine is executing a second application, and the processor circuitry is to at least one of instantiate or execute the instructions to in response to a second identification of a failure of a third virtual machine to execute a third application, determine whether one or more first resources are available to failover the third application, in response to a determination that the one or more first resources are not available, terminate the second application, and restart the third application on the second virtual machine.

Example 7 includes the apparatus of example 1, wherein the identification is a first identification, the application is a first application, and the processor circuitry is to at least one of instantiate or execute the instructions to in response to a second identification of a failure of a third virtual machine to execute a second application, determine whether one or more first resources are available to failover the third virtual machine, in response to a determination that the one or more first resources are not available, add one or more second resources to the virtual server rack, and restart the second application using the one or more second resources.

Example 8 includes the apparatus of example 1, wherein the processor circuitry is to at least one of instantiate or execute the instructions to at least one of instantiate or execute the instructions to in response to the deployment of the second virtual machine in the high availability slot, identify a first protection state of the first virtual machine as protected and a second protection state of the second virtual machine as unprotected, store in a datastore a first association of (i) the first protection state of the first virtual machine and (ii) the second protection state of the second virtual machine, in response to the trigger of the shutdown of the first virtual machine, store in the datastore a second association of (i) the first protection state of the first virtual machine as unprotected and (ii) the second protection state of the second virtual machine as protected, and replace the first association with the second association to synchronize the migration data.

Example 9 includes at least one non-transitory computer readable storage medium comprising instructions that, when executed, cause processor circuitry to at least identify a high availability slot in a virtual server rack, the high availability slot to facilitate a failover of an application executing on a first virtual machine in the virtual server rack, the first virtual machine identified as a protected virtual machine, deploy a second virtual machine in the high availability slot, transfer data from the first virtual machine to the second virtual machine, and in response to not identifying a failure of at least one of the first virtual machine or the second virtual machine during the transfer of the data trigger a shutdown of the first virtual machine, and synchronize migration data associated with the virtual server rack to identify the second virtual machine as the protected virtual machine.

Example 10 includes the at least one non-transitory computer readable storage medium of example 9, wherein the high availability slot is associated with at least one of a computing resource, a network resource, or a storage resource, and the high availability slot is reserved to facilitate the failover of the first virtual machine by restarting the first virtual machine using the at least one of the compute resource, the network resource, or the storage resource.

Example 11 includes the at least one non-transitory computer readable storage medium of example 9, wherein the identification is a first identification, and the instructions, when executed, cause the processor circuitry to in response to the deployment of the second virtual machine in the high availability slot, identify the second virtual machine as an unprotected virtual machine, the second virtual machine to not be restarted in response to a failure of the second virtual machine when identified as the unprotected virtual machine, generate the migration data to include a first identification of the first virtual machine as the protected virtual machine and a second identification of the second virtual machine as the unprotected virtual machine, and in response to a second identification of the second virtual machine as the protected virtual machine, store the migration data in a datastore to be accessed by at least one of the first virtual machine or the second virtual machine.

Example 12 includes the at least one non-transitory computer readable storage medium of example 9, wherein the identification is a first identification, the application is a first application having a first version, and the instructions, when executed, cause the processor circuitry to install a second application having a second version on the second virtual machine, in response to a second identification of a failure of the first virtual machine, terminate the second application, restart the first application on the second virtual machine in the high availability slot to restore the virtual server rack, and in response to the restore of the virtual server rack, restart an upgrade of the first application.

Example 13 includes the at least one non-transitory computer readable storage medium of example 9, wherein the identification is a first identification, the application is a first application, and the instructions, when executed, cause the processor circuitry to in response to a second identification of a failure of the first virtual machine prior to the deployment of the second virtual machine, restart the first application on a third virtual machine in the high availability slot, and in response to a third identification of the failure of the first virtual machine after the deployment of the second virtual machine terminate a second application on the second virtual machine, and restart the first application on the second virtual machine in the high availability slot.

Example 14 includes the at least one non-transitory computer readable storage medium of example 9, wherein the identification is a first identification, the application is a first application, the second virtual machine is executing a second application, and the instructions, when executed, cause the processor circuitry to in response to a second identification of a failure of a third virtual machine to execute a third application, determine whether one or more first resources are available to failover the third application, in response to a determination that the one or more first resources are not available, terminate the second application, and restart the third application on the second virtual machine.

Example 15 includes the at least one non-transitory computer readable storage medium of example 9, wherein the identification is a first identification, the application is a first application, and the instructions, when executed, cause the processor circuitry to in response to a second identification of a failure of a third virtual machine to execute a second application, determine whether one or more first resources are available to failover the third virtual machine, in response to a determination that the one or more first resources are not available, add one or more second resources to the virtual server rack, and restart the second application using the one or more second resources.

Example 16 includes the at least one non-transitory computer readable storage medium of example 9, wherein the instructions, when executed, cause the processor circuitry to in response to the deployment of the second virtual machine in the high availability slot, identify a first protection state of the first virtual machine as protected and a second protection state of the second virtual machine as unprotected, store in a datastore a first association of (i) the first protection state of the first virtual machine and (ii) the second protection state of the second virtual machine, in response to the trigger of the shutdown of the first virtual machine, store in the datastore a second association of (i) the first protection state of the first virtual machine as unprotected and (ii) the second protection state of the second virtual machine as protected, and replace the first association with the second association to synchronize the migration data.

Example 17 includes a method for high availability application migration in a virtualized environment, the method comprising identifying, by executing an instruction with processor circuitry, a high availability slot in a virtual server rack, the high availability slot to facilitate a failover of an application executing on a first virtual machine in the virtual server rack, the first virtual machine identified as a protected virtual machine, deploying, by executing an instruction with the processor circuitry, a second virtual machine in the high availability slot, transferring, by executing an instruction with the processor circuitry, data from the first virtual machine to the second virtual machine, and in response to not identifying a failure of at least one of the first virtual machine or the second virtual machine during the transferring of the data triggering, by executing an instruction with the processor circuitry, a shutdown of the first virtual machine, and synchronizing, by executing an instruction with the processor circuitry, migration data associated with the virtual server rack to identify the second virtual machine as the protected virtual machine.

Example 18 includes the method of example 17, wherein the high availability slot is associated with at least one of a computing resource, a network resource, or a storage resource, and the high availability slot is reserved to facilitate the failover of the first virtual machine by restarting the first virtual machine using the at least one of the compute resource, the network resource, or the storage resource.

Example 19 includes the method of example 17, further including in response to deploying the second virtual machine in the high availability slot, identifying the second virtual machine as an unprotected virtual machine, the second virtual machine to not be restarted in response to a failure of the second virtual machine when identified as the unprotected virtual machine, generating the migration data to include a first identification of the first virtual machine as the protected virtual machine and a second identification of the second virtual machine as the unprotected virtual machine, and in response to identifying the second virtual machine as the protected virtual machine, storing the migration data in a datastore to be accessed by at least one of the first virtual machine or the second virtual machine.

Example 20 includes the method of example 17, wherein the application is a first application having a first version, and further including installing a second application having a second version on the second virtual machine, in response to identifying a failure of the first virtual machine, terminating the second application, restarting the first application on the second virtual machine to restore the virtual server rack, and in response to restoring the virtual server rack, restarting an upgrade of the first application.

Example 21 includes the method of example 17, wherein the application is a first application, and further including in response to identifying a failure of the first virtual machine prior to the deploying of the second virtual machine, restarting the first application on a third virtual machine using the high availability slot, and in response to identifying the failure of the first virtual machine after the deploying of the second virtual machine terminating a second application on the second virtual machine, and restarting the first application on the second virtual machine.

Example 22 includes the method of example 17, wherein the application is a first application, the second virtual machine is executing a second application, and further including in response to identifying a failure of a third virtual machine executing a third application, determining whether one or more first resources are available to failover the third application, in response to determining that the one or more first resources are not available, terminating the second application, and restarting the third application on the second virtual machine.

Example 23 includes the method of example 17, wherein the application is a first application, and further including in response to identifying a failure of a third virtual machine executing a second application, determining whether one or more first resources are available to failover the third virtual machine, in response to determining that the one or more first resources are not available, adding one or more second resources to the virtual server rack, and restarting the second application using the one or more second resources.

Example 24 includes the method of example 17, further including in response to deploying the second virtual machine in the high availability slot, identifying a first protection state of the first virtual machine as protected and a second protection state of the second virtual machine as unprotected, storing in a datastore a first association of (i) the first protection state of the first virtual machine and (ii) the second protection state of the second virtual machine, in response to triggering the shutdown of the first virtual machine, storing in the datastore a second association of (i) the first protection state of the first virtual machine as unprotected and (ii) the second protection state of the second virtual machine as protected, and replacing the first association with the second association to synchronize the migration data.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system for high availability application migration in a virtualized environment, the system comprising:
   at least one memory;
   instructions in the system; and
   programmable circuitry to at least one of execute or instantiate the instructions to:
      identify a high availability slot in a virtual server rack, the high availability slot to facilitate a failover of an application executing on a first virtual machine in the virtual server rack, the first virtual machine identified as corresponding to a protected virtual machine status;
      deploy a second virtual machine in the high availability slot;
      transfer data from the first virtual machine to the second virtual machine; and
      after not identifying a failure of at least one of the first virtual machine or the second virtual machine during the transfer of the data:
         trigger a shutdown of the first virtual machine; and
         synchronize migration data associated with the virtual server rack to identify the second virtual machine as corresponding to the protected virtual machine status.

2. The system, of claim 1, wherein the high availability slot is associated with at least one of a compute resource, a network resource, or a storage resource, and the high availability slot is reserved to facilitate the failover of the first virtual machine by restarting the first virtual machine using the at least one of the compute resource, the network resource, or the storage resource.

3. The system of claim 1, wherein the identification of the first virtual machine as corresponding to the protected virtual machine status is a first identification, and the programmable circuitry is to at least one of instantiate or execute the instructions to:
   after the deployment of the second virtual machine in the high availability slot, identify the second virtual machine as corresponding to an unprotected virtual machine status, the second virtual machine to not be restarted in response to a failure of the second virtual machine when identified as corresponding to the unprotected virtual machine status;
   generate the migration data to include a first indication of the first virtual machine as corresponding to the protected virtual machine status and a second indication of the second virtual machine as corresponding to the unprotected virtual machine status; and
   after a second identification of the second virtual machine as corresponding to the protected virtual machine status, store the migration data in a datastore to be accessed by at least one of the first virtual machine or the second virtual machine.

4. The system of claim 1, wherein the identification of the high availability slot is a first identification, the application is a first application having a first version, and the programmable circuitry is to at least one of instantiate or execute the instructions to:

install a second application having a second version on the second virtual machine;

after a second identification of a failure of the first virtual machine, terminate the second application;

restart the first application on the second virtual machine in the high availability slot to restore the virtual server rack; and after the restore of the virtual server rack, restart an upgrade of the first application.

5. The system of claim 1, wherein the identification of the high availability slot is a first identification, the application is a first application, and the programmable circuitry is to at least one of instantiate or execute the instructions to:

in response to a second identification of a failure of the first virtual machine prior to the deployment of the second virtual machine, restart the first application on a third virtual machine in the high availability slot; and in response to a third identification of the failure of the first virtual machine after the deployment of the second virtual machine:
terminate a second application on the second virtual machine; and
restart the first application on the second virtual machine in the high availability slot.

6. The system of claim 1, wherein the identification of the high availability slot is a first identification, the application is a first application, the second virtual machine is executing a second application, and the programmable circuitry is to at least one of instantiate or execute the instructions to:

after a second identification of a failure of a third virtual machine to execute a third application, determine whether one or more first resources are available to failover the third application;

after a determination that the one or more first resources are not available, terminate the second application; and restart the third application on the second virtual machine.

7. The system of claim 1, wherein the identification of the high availability slot is a first identification, the application is a first application, and the programmable circuitry is to at least one of instantiate or execute the instructions to:

after a second identification of a failure of a third virtual machine to execute a second application, determine whether one or more first resources are available to failover the third virtual machine;

after a determination that the one or more first resources are not available, add one or more second resources to the virtual server rack; and restart the second application using the one or more second resources.

8. The system of claim 1, wherein the programmable circuitry is to at least one of instantiate or execute the instructions to:

after the deployment of the second virtual machine in the high availability slot, identify a first protection state of the first virtual machine as protected and a second protection state of the second virtual machine as unprotected;

store in a datastore a first association of (i) the first protection state of the first virtual machine and (ii) the second protection state of the second virtual machine;

after the trigger of the shutdown of the first virtual machine, store in the datastore a second association of (i) the first protection state of the first virtual machine as unprotected and (ii) the second protection state of the second virtual machine as protected; and replace the first association with the second association to synchronize the migration data.

9. At least one non-transitory computer readable storage medium comprising instructions to cause programmable circuitry to at least:

identify a high availability slot in a virtual server rack, the high availability slot to facilitate a failover of an application executing on a first virtual machine in the virtual server rack, the first virtual machine identified as protected;

deploy a second virtual machine in the high availability slot;

transfer data from the first virtual machine to the second virtual machine; and after not identifying a failure of at least one of the first virtual machine or the second virtual machine during the transfer of the data:
trigger a shutdown of the first virtual machine; and
synchronize migration data associated with the virtual server rack to identify the second virtual machine as protected.

10. The at least one non-transitory computer readable storage medium of claim 9, wherein the high availability slot is associated with at least one of a compute resource, a network resource, or a storage resource, and the high availability slot is reserved to facilitate the failover of the first virtual machine by restarting the first virtual machine using the at least one of the compute resource, the network resource, or the storage resource.

11. The at least one non-transitory computer readable storage medium of claim 9, wherein the identification of the first virtual machine as protected is a first identification, and the instructions are to cause the programmable circuitry to:

after the deployment of the second virtual machine in the high availability slot, identify the second virtual machine as unprotected, the second virtual machine to not be restarted in response to a failure of the second virtual machine when identified as unprotected;

generate the migration data to include a first indication of the first virtual machine as protected and a second indication of the second virtual machine as unprotected; and after a second identification of the second virtual machine as protected, store the migration data in a datastore to be accessed by at least one of the first virtual machine or the second virtual machine.

12. The at least one non-transitory computer readable storage medium of claim 9, wherein the identification of the high availability slot is a first identification, the application is a first application having a first version, and the instructions are to cause the programmable circuitry to:

install a second application having a second version on the second virtual machine;

after a second identification of a failure of the first virtual machine, terminate the second application;

restart the first application on the second virtual machine in the high availability slot to restore the virtual server rack; and after the restore of the virtual server rack, restart an upgrade of the first application.

13. The at least one non-transitory computer readable storage medium of claim 9, wherein the identification of the high availability slot is a first identification, the application is a first application, and the instructions are to cause the programmable circuitry to:

after a second identification of a failure of the first virtual machine prior to the deployment of the second virtual machine, restart the first application on a third virtual machine in the high availability slot; and after a third identification of the failure of the first virtual machine after the deployment of the second virtual machine:
  terminate a second application on the second virtual machine; and
  restart the first application on the second virtual machine in the high availability slot.

14. The at least one non-transitory computer readable storage medium of claim 9, wherein the identification of the high availability slot is a first identification, the application is a first application, the second virtual machine is executing a second application, and the instructions are to cause the programmable circuitry to:
  after a second identification of a failure of a third virtual machine to execute a third application, determine whether one or more first resources are available to failover the third application;
  after a determination that the one or more first resources are not available, terminate the second application; and
  restart the third application on the second virtual machine.

15. The at least one non-transitory computer readable storage medium of claim 9, wherein the identification of the high availability slot is a first identification, the application is a first application, and the instructions are to cause the programmable circuitry to:
  after a second identification of a failure of a third virtual machine to execute a second application, determine whether one or more first resources are available to failover the third virtual machine;
  after a determination that the one or more first resources are not available, add one or more second resources to the virtual server rack; and
  restart the second application using the one or more second resources.

16. The at least one non-transitory computer readable storage medium of claim 9, wherein the instructions are to cause the programmable circuitry to:
  after the deployment of the second virtual machine in the high availability slot, identify a first protection state of the first virtual machine as protected and a second protection state of the second virtual machine as unprotected;
  store in a datastore a first association of (i) the first protection state of the first virtual machine and (ii) the second protection state of the second virtual machine;
  after the trigger of the shutdown of the first virtual machine, store in the datastore a second association of (i) the first protection state of the first virtual machine as unprotected and (ii) the second protection state of the second virtual machine as protected; and
  replace the first association with the second association to synchronize the migration data.

17. A method for high availability application migration in a virtualized environment, the method comprising:
  identifying, by executing an instruction with programmable circuitry, a high availability slot in a virtual server rack, the high availability slot to facilitate a failover of an application executing on a first virtual machine in the virtual server rack, the first virtual machine identified as protected;
  deploying, by executing an instruction with the programmable circuitry, a second virtual machine in the high availability slot;
  transferring, by executing an instruction with the programmable circuitry, data from the first virtual machine to the second virtual machine; and
  after not identifying a failure of at least one of the first virtual machine or the second virtual machine during the transferring of the data:
    triggering, by executing an instruction with the programmable circuitry, a shutdown of the first virtual machine; and
    synchronizing, by executing an instruction with the programmable circuitry, migration data associated with the virtual server rack to identify the second virtual machine as protected.

18. The method of claim 17, wherein the high availability slot is associated with at least one of a compute resource, a network resource, or a storage resource, and the high availability slot is reserved to facilitate the failover of the first virtual machine by restarting the first virtual machine using the at least one of the compute resource, the network resource, or the storage resource.

19. The method of claim 17, further including:
  after the deploying of the second virtual machine in the high availability slot, identifying the second virtual machine as unprotected, the second virtual machine to not be restarted in response to a failure of the second virtual machine when identified as unprotected;
  generating the migration data to include a first indication of the first virtual machine as protected and a second indication of the second virtual machine as unprotected; and
  after the identifying of the second virtual machine as protected, storing the migration data in a datastore to be accessed by at least one of the first virtual machine or the second virtual machine.

20. The method of claim 17, wherein the application is a first application having a first version, and further including:
  installing a second application having a second version on the second virtual machine;
  after identifying a failure of the first virtual machine, terminating the second application;
  restarting the first application on the second virtual machine to restore the virtual server rack; and
  after restoring the virtual server rack, restarting an upgrade of the first application.

21. The method of claim 17, wherein the application is a first application, and further including:
  in response to identifying a failure of the first virtual machine prior to the deploying of the second virtual machine, restarting the first application on a third virtual machine using the high availability slot; and
  in response to identifying the failure of the first virtual machine after the deploying of the second virtual machine:
    terminating a second application on the second virtual machine; and
    restarting the first application on the second virtual machine.

22. The method of claim 17, wherein the application is a first application, the second virtual machine is executing a second application, and further including:
  after identifying a failure of a third virtual machine executing a third application, determining whether one or more first resources are available to failover the third application;
  after determining that the one or more first resources are not available, terminating the second application; and
  restarting the third application on the second virtual machine.

23. The method of claim 17, wherein the application is a first application, and further including:

after identifying a failure of a third virtual machine executing a second application, determining whether one or more first resources are available to failover the third virtual machine;

after determining that the one or more first resources are not available, adding one or more second resources to the virtual server rack; and restarting the second application using the one or more second resources.

24. The method of claim 17, further including:

after deploying the second virtual machine in the high availability slot, identifying a first protection state of the first virtual machine as protected and a second protection state of the second virtual machine as unprotected;

storing in a datastore a first association of (i) the first protection state of the first virtual machine and (ii) the second protection state of the second virtual machine;

after triggering the shutdown of the first virtual machine, storing in the datastore a second association of (i) the first protection state of the first virtual machine as unprotected and (ii) the second protection state of the second virtual machine as protected; and replacing the first association with the second association to synchronize the migration data.

* * * * *